(12) United States Patent
Yahagi

(10) Patent No.: US 9,509,423 B2
(45) Date of Patent: Nov. 29, 2016

(54) BROADCAST SYSTEM, BROADCAST CONTROL APPARATUS, AND BROADCAST METHOD

(75) Inventor: Masahiko Yahagi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 369 days.

(21) Appl. No.: 12/997,318

(22) PCT Filed: May 22, 2009

(86) PCT No.: PCT/JP2009/059442
§ 371 (c)(1),
(2), (4) Date: Dec. 10, 2010

(87) PCT Pub. No.: WO2009/154057
PCT Pub. Date: Dec. 23, 2009

(65) Prior Publication Data
US 2011/0099568 A1    Apr. 28, 2011

(30) Foreign Application Priority Data

Jun. 17, 2008 (JP) ................. 2008-158067

(51) Int. Cl.
*H04N 7/16* (2011.01)
*H04H 60/46* (2008.01)
*H04H 20/38* (2008.01)
(Continued)

(52) U.S. Cl.
CPC ............ *H04H 60/46* (2013.01); *H04H 20/38* (2013.01); *H04H 20/423* (2013.01); *H04H 60/61* (2013.01); *H04N 21/2385* (2013.01); *H04N 21/23805* (2013.01); *H04N 21/258* (2013.01); *H04H 20/30* (2013.01); *H04H 2201/37* (2013.01); *H04N 21/2402* (2013.01); *H04N 21/2408* (2013.01); *H04N 21/26216* (2013.01); *H04N 21/64738* (2013.01); *H04W 72/005* (2013.01)

(58) Field of Classification Search
CPC ................................................... H04N 21/238
See application file for complete search history.

(56) References Cited

U.S. PATENT DOCUMENTS 7,207,055 B1 * 4/2007 Hendricks et al. ............. 725/95
2002/0144266 A1 * 10/2002 Goldman et al. .............. 725/46
(Continued)

FOREIGN PATENT DOCUMENTS

EP        1209913 A     5/2002
JP     2001313922 A    11/2001
(Continued)

OTHER PUBLICATIONS

Supplementary European Search Report for EP 09 76 6505 completed Nov. 21, 2011.
(Continued)

*Primary Examiner* — Fernando Alcon

(57) ABSTRACT

A broadcast apparatus transmits data of programs. A broadcast control apparatus measures the extent of viewing requests from users of terminals as scores for programs that are transmitted from the broadcast apparatus, and based on the scores that were measured, determines the service quality that is used in the broadcast of the programs. A communication access network apparatus, upon determination of the service quality of programs by the broadcast control apparatus, broadcasts data of programs that are received from the broadcast apparatus by communication channels having a transmission rate that corresponds to the service quality.

17 Claims, 31 Drawing Sheets

| Channel Number | Status | Broadcast Content Information | Score |
|---|---|---|---|
| CH1 | Broadcasting at basic rate | Baseball relay broadcast | 20 |
| CH2 | Broadcasting at ½-rate | Soccer relay broadcast | 10 |
| CH3 | Broadcasting at ½-rate | Tennis relay broadcast | 8 |
| CH4 | Broadcasting at basic rate | wrestling relay broadcast | 15 |
| . | . | . | . |
| . | . | . | . |
| . | . | . | . |

(51) Int. Cl.
   *H04H 20/42*   (2008.01)
   *H04H 60/61*   (2008.01)
   *H04N 21/238*  (2011.01)
   *H04N 21/2385* (2011.01)
   *H04N 21/258*  (2011.01)
   *H04H 20/30*   (2008.01)
   *H04N 21/24*   (2011.01)
   *H04N 21/262*  (2011.01)
   *H04N 21/647*  (2011.01)
   *H04W 72/00*   (2009.01)

(56) References Cited

U.S. PATENT DOCUMENTS

2004/0226044 A1* 11/2004 Goode .................... 725/95
2006/0010470 A1*  1/2006 Kurosaki et al. ........ 725/46
2006/0218586 A1*  9/2006 Pohjolainen et al. .... 725/39
2007/0192805 A1*  8/2007 Dutta et al. ............. 725/64
2008/0242258 A1* 10/2008 Lim et al. ............. 455/344
2008/0244667 A1* 10/2008 Osborne ........... H04N 7/17318
                                                    725/94

FOREIGN PATENT DOCUMENTS

| JP | 2002084238 A   | 3/2002  |
| JP | 2002351438 A   | 12/2002 |
| JP | 2003333571 A   | 11/2003 |
| JP | 2005516474 A   | 6/2005  |
| JP | 2007174645 A   | 7/2007  |
| WO | 2005084031 A   | 9/2005  |
| WO | 2007/064380 A1 | 6/2007  |

OTHER PUBLICATIONS

International Search Report for PCT/JP2009/059442 mailed Jun. 23, 2009.
Japanese Office Action for JP Application No. 2010-517824 mailed on Nov. 19, 2013 with Partial English Translation.

* cited by examiner

| Channel Number | Status | Broadcast Content Information | Score |
|---|---|---|---|
| CH1 | Broadcasting at basic rate | Baseball relay broadcast | 20 |
| CH2 | Broadcasting at ½-rate | Soccer relay broadcast | 10 |
| CH3 | Broadcasting at ½-rate | Tennis relay broadcast | 8 |
| CH4 | Broadcasting at basic rate | wrestling relay broadcast | 15 |
| ⋮ | ⋮ | ⋮ | ⋮ |

Fig.12

| Terminal ID | Viewed ch | Requested ch |
|---|---|---|
| 1 | 1 | 1 |
| ... | ... | ... |
| 19 | 1 | 1 |
| 20 | 1 | 2 |
| 21 | 1 | 2 |
| 22 | 1 | 2 |
| 23 | 1 | 3 |
| 24 | 1 | 3 |
| 25 | 1 | 3 |
| 26 | 1 | 4 |
| 27 | 4 | 1 |
| 28 | 4 | 1 |
| 29 | 4 | 2 |

(19 terminals: IDs 1–19; 3 terminals: IDs 20–22; 3 terminals: IDs 23–25)

| Terminal ID | Viewed ch | Requested ch |
|---|---|---|
| 30 | 4 | 2 |
| 31 | 4 | 3 |
| 32 | 4 | 3 |
| 33 | 4 | 3 |
| 34 | 4 | 1 |
| ... | ... | ... |
| 50 | 4 | 1 |
| 51 | SBY | 2 |
| ... | ... | ... |
| 55 | SBY | 2 |
| 56 | SBY | 3 |
| ... | ... | ... |
| 62 | SBY | 3 |

(3 terminals: IDs 31–33; 17 terminals: IDs 34–50; 5 terminals: IDs 51–55; 7 terminals: IDs 56–62)

Fig.15

| Viewed ch | Requested ch | Number of Reports |
|---|---|---|
| 1 | — | 19 |
| 1 | 2 | 3 |
| 1 | 3 | 3 |
| 1 | 4 | 1 |
| 4 | 1 | 2 |
| 4 | 2 | 2 |
| 4 | 3 | 3 |
| 4 | — | 17 |
| SBY | 1 | 0 |
| SBY | 2 | 5 |
| SBY | 3 | 7 |
| SBY | 4 | 0 |

Fig.16

| Viewed ch | Requested ch | Number of Reports |
|---|---|---|
| 1 | — | 19 |
| 4 | 1 | 2 |
| SBY | 1 | 0 |
| 1 | 2 | 3 |
| 4 | 2 | 2 |
| SBY | 2 | 5 |
| 1 | 3 | 3 |
| 4 | 3 | 3 |
| SBY | 3 | 7 |
| 1 | 4 | 1 |
| 4 | — | 17 |
| SBY | 4 | 0 |

Fig.17

| Viewed ch | Requested ch | Number of Reports |
|---|---|---|
| 1 | — | 19 |
| 1 | 2 | 5 |
| 1 | 3 | 3 |
| 1 | 4 | 1 |
| 4 | 1 | 2 |
| 4 | 2 | 4 |
| 4 | 3 | 3 |
| 4 | — | 13 |
| SBY | 1 | 0 |
| SBY | 2 | 8 |
| SBY | 3 | 7 |
| SBY | 4 | 0 |

Fig.18

| Viewed ch | Requested ch | Number of Reports |
|---|---|---|
| 1 | — | 19 |
| 4 | 1 | 2 |
| SBY | 1 | 0 |
| 1 | 2 | 5 |
| 4 | 2 | 4 |
| SBY | 2 | 8 |
| 1 | 3 | 3 |
| 4 | 3 | 3 |
| SBY | 3 | 7 |
| 1 | 4 | 1 |
| 4 | — | 13 |
| SBY | 4 | 0 |

Fig.19

| Program | Viewing Number | Requesting Number | Other ch Request Number | Score |
|---|---|---|---|---|
| 1 | 26 | 2 | 7 | 21 |
| 2 | 0 | 10 | 0 | 10 |
| 3 | 0 | 13 | 0 | 13 |
| 4 | 24 | 1 | 7 | 18 |

| Program | Viewing Number | Requesting Number | Other ch Request Number | Score |
|---|---|---|---|---|
| 1 | 28 | 2 | 9 | 21 |
| 2 | 0 | 17 | 0 | 17 |
| 3 | 0 | 13 | 0 | 13 |
| 4 | 22 | 1 | 9 | 14 |

| Program | Number of Votes |
|---------|-----------------|
| 1 | 21 |
| 2 | 10 |
| 3 | 13 |
| 4 | 18 |

Fig.22

| Program | Number of Votes |
|---------|-----------------|
| 1 | 21 |
| 2 | 17 |
| 3 | 13 |
| 4 | 14 |

Fig. 27

| Ch | status | program | vote | Req |
|---|---|---|---|---|
| 1: | Full Viewing | Baseball | 21 | |
| 2: | Half Viewing | Soccer | 10 | R |
| 3: | Half Viewing | Tennis | 13 | |
| 4: | Full Viewing | Wrestling | 18 | |

Fig.29

| Ch | status | program | vote | Req |
|---|---|---|---|---|
| 1: | Full Viewing | Baseball | 21 | |
| 2: | Chng to Full | Soccer | 17 | R |
| 3: | Half Viewing | Tennis | 13 | |
| 4: | Chng to Half | Wrestling | 14 | |

BROADCAST SYSTEM, BROADCAST CONTROL APPARATUS, AND BROADCAST METHOD

This application is the National Phase of PCT/JP2009/059442, filed May 22, 2009, which claims the benefits of priority based on Japanese Patent Application No. 2008-158067 for which application was submitted on Jun. 17, 2008 and incorporates all of the disclosures of that application.

TECHNICAL FIELD

The present invention relates to a data communication technique for distributing the same data to a plurality of terminals by a communication system.

BACKGROUND ART

In a radio communication system that covers a communication area by cells made up by radio base stations, communication among radio terminals over a wide range is made possible by the arrangement of a plurality of cells. In WiMAX (Worldwide Interoperability for Microwave Access), for example, communication is made possible in a variety of locations by covering communication areas by small-scale cells referred to as femtocells. In this type of radio communication system, there exists one form of communication in which the data of programs are broadcast to a plurality of radio terminals (see JP2005-516474A and JP2007-174645A).

The data of programs are broadcast by radio channels set within bands that can be used by the radio communication system. Users can view programs by using radio terminals to receive the data of radio channels by which the programs are broadcast. Typical radio terminals for viewing this type of broadcast include stationary terminals as represented by radios or televisions for home use or portable terminals that can be transported.

However, radio resources are limited in a radio communication system. In addition, radio bands that can be used for broadcasting programs are further limited because radio channels are also used in point-to-point communication.

A state in which there are insufficient radio bands available for use to broadcast programs can occur regardless of the number of programs to be broadcast. For example, when there are ten programs and a radio band of 1 MHz is required for broadcasting a single program, a band of 10 MHz is required to broadcast all of the programs. However, cases can actually occur in which a radio band of only 3 MHz is available. In such states, it is difficult to decide how programs can be broadcast.

A technique is disclosed in JP2001-313922A (paragraphs 0023-0024) in which the users' inclinations are considered in the selection of programs to be broadcast. However, this technique does not reflect users' inclinations in real time when selecting programs to be broadcast. In addition, a particular program may not be broadcast at all if viewing requests for that program are fewer than other programs. The undesirable situation may therefore occur in which a program desired by users cannot be viewed at all even when there are users who wish to view the program.

JP2003-333571A discloses a technique in which the details of the content or users' preferences are considered in compressing content data that are to be distributed in a network. In addition, JP2002-351438A discloses a technique for controlling the image size, picture quality, and frame rate of image information that is distributed. However, the constructions disclosed in these documents do not take into consideration 1:N broadcast.

Although radio communication systems have here been mentioned by way of example, the broadcast of program data is carried out similarly in a wired communication system. The limitation of communication resources also applies to wired communication systems.

DISCLOSURE OF THE INVENTION

In the communication system described hereinabove, the communication band that can be used in the broadcast of programs is limited, and the problem therefore arises of how to enable users to view as many desired programs as possible as the number of programs increases.

It is an object of the present invention to provide a technique that ensures that the preferences of users will be reflected in broadcasting programs.

In order to achieve the above-described object, the broadcast system of the present invention is a broadcast system that assigns communication channels to programs to broadcast data of the programs to terminals, the broadcast system including:

a broadcast apparatus that transmits data of the programs;

a broadcast control apparatus that, for the programs that are transmitted from the broadcast apparatus, measures the extent of viewing requests from users of the terminals as scores and determines the service quality used in the broadcast of the programs based on the measured scores; and a communication access network apparatus that, upon determination of the service quality of the programs by the broadcast control apparatus, broadcasts data of the programs that are received from the broadcast apparatus by communication channels having a transmission rate that corresponds to the service quality.

The broadcast control apparatus of the present invention is a broadcast control apparatus that, in a broadcast system that assigns communication channels to programs to broadcast data of the programs to terminals, manages programs that are broadcast; the broadcast control apparatus including:

score measurement means that, for each of the programs that can be broadcast by the communication channels, measures the extent of viewing requests from users of the terminals as scores; and determination means that, based on the scores that were measured in the score measurement means, determines the service quality used in the broadcast of the programs.

The broadcast method of the present invention is a broadcast method for assigning communication channels to programs to broadcast data of the programs to terminals, the broadcast method including steps of:

for each of the programs that can be broadcast by the communication channels, measuring the extent of viewing requests from users of the terminals as scores; and based on the scores measured in the score measurement means, determining the service quality used in the broadcast of the programs.

BRIEF DESCRIPTION OF THE DRAWINGS

FIG. 12 is an example of the states of the viewing and requests of programs by each radio terminal in the coverage area of a base station apparatus at a particular time;

FIG. 15 is a table of the states shown in FIG. 13;

FIG. 16 is a table in which the table of FIG. 15 is reordered;

FIG. 17 is a table of the states shown in FIG. 13;

FIG. 18 is a table in which the table of FIG. 17 is reordered;

FIG. 19 is a view for explaining the process of computing the scores of each program in the states of FIG. 13 (and FIGS. 15 and 16);

FIG. 20 is a view for explaining the process of computing scores of each program in the states of FIG. 14 (and FIGS. 17 and 18);

FIG. 21 is a table showing the scores of each program in the states of FIG. 13;

FIG. 22 is a table showing the scores of each program in the states of FIG. 14;

FIG. 27 shows an example of state display by radio terminal 15 in the score state shown in FIG. 21;

FIG. 29 shows an example of the state display by radio terminal 15 upon change from the score state shown in FIG. 21 to the score state shown in FIG. 22;

BEST MODE FOR CARRYING OUT THE INVENTION

An exemplary embodiment of the present invention is next described in detail with reference to the accompanying drawings.

Figure 1:
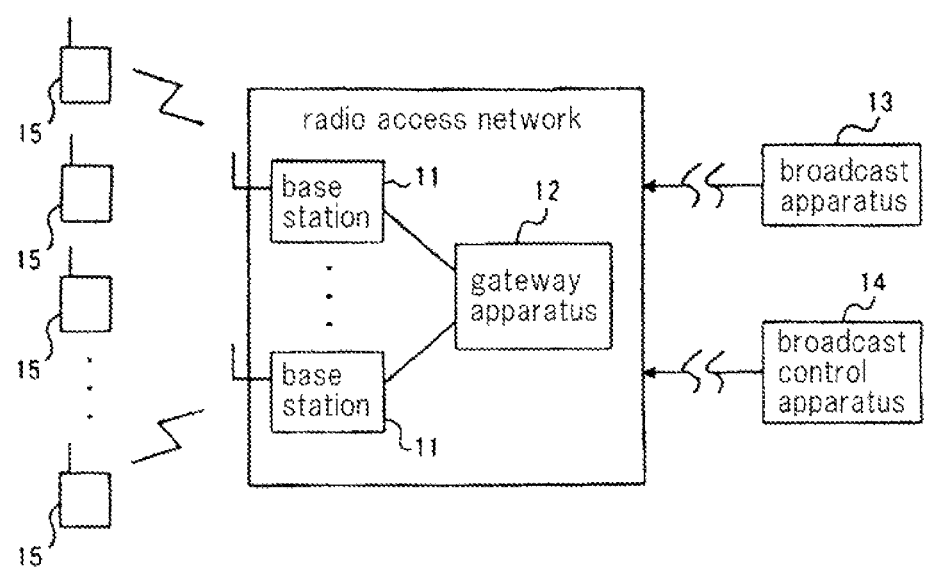
FIG. 1 is a block diagram showing the configuration of the broadcast system according to the present exemplary embodiment.

FIG. 1 is a block diagram showing the configuration of the broadcast system according to the present exemplary embodiment. Referring to FIG. 1, the broadcast system includes: base station apparatus 11, gateway apparatus 12, broadcast apparatus 13, and broadcast control apparatus 14. Radio access network 16 is made up of base station apparatus 11 and gateway apparatus 12. Base station apparatus 11 transmits data to and receives data from radio terminal 15 by radio channels.

The broadcast system of the present exemplary embodiment supports, in addition to point-to-point bidirectional communication represented by speech communication, communication in broadcast form for broadcasting program data to a plurality of radio terminals 15 from base station apparatus 11. Broadcast apparatus 13 and broadcast control apparatus 14 are devices for realizing broadcasting of programs.

Broadcast apparatus 13 supplies data of programs. As an example, data that are supplied from broadcast apparatus 13 are sent to base station apparatus II by way of a network (not shown) and gateway apparatus 12.

Data of programs are broadcast from base station apparatus 11 to radio terminals 15 by radio channels, but it is here assumed that, due to limitations of the radio band between base station apparatus 11 and radio terminals 15, radio channels that have a sufficient transmission rate cannot be allotted to all programs. As a result, the service quality of each program is determined based on the result of collecting and adding viewing requests from users and the data of a program are then broadcast from base station apparatus 11 at a transmission rate that accords with the service quality. At this time, the component that causes the data of a program to conform to a determined service quality may be broadcast apparatus 13 or may be base station apparatus 11. As one example, broadcast apparatus 13 transmits the data of a program to gateway apparatus 12 at the determined service quality. As another example, base station apparatus 11 converts the data of a program that have been received from broadcast apparatus 13 to conform to the determined service quality. As the service quality, a plurality of levels may be prescribed by, for example, the resolution of images, the number of frames per unit time interval of images, or both the resolution and the number of frames per unit time of images, and the service quality to which each program is set may be selected.

Instead of broadcasting all programs at any transmission rate, the programs that are to be broadcast and the service quality at which programs are to be broadcast may be determined based on the result of collecting and adding the viewing requests from users in the present exemplary embodiment, this case is described as an example. In this case, there are programs that are broadcast by a radio channel from base station apparatus 11 and programs that can be broadcast but that are not actually broadcast. Viewing requests are accepted from users for any program.

Radio terminals 15 are devices that realize communication desired by a user by transmitting and receiving data by way of base station apparatus 11. Regarding the broadcast of programs, radio terminals 15 are able to select the programs desired by users from among a plurality of programs being broadcast by radio channels from base station apparatus 11 and receive the data of the programs. Users are thus able to view desired programs.

Radio terminals 15 further send to broadcast control apparatus 14 by way of base station apparatus 11 viewing request messages that carry request information indicating programs that users are to view or that users wish to view that have been selected from among programs that are being broadcast on radio channels from base station apparatus 11 and programs that can be broadcast but that are not actually being broadcast.

As examples of the timing of transmission of viewing request messages, cases are considered in which a user carries out operations to start or end viewing of a program and in which a user carries out operations to change a program that is being viewed. Viewing request messages may also be sent when radio terminal 15 enters or leaves the coverage area of a certain base station apparatus 11 while a program is being viewed. As another example, the sending of viewing request messages at fixed time intervals is also considered.

Broadcast control apparatus 14 both determines the programs that are to be actually broadcast on radio channels from among programs that are supplied from a plurality of broadcast apparatuses 13 and determines the service quality of the programs that are broadcast. The content of the determinations by broadcast control apparatus 14 is communicated to base station apparatus 11 by way of a network (not shown) and gateway apparatus 12. In addition, when broadcast apparatus 13 is to cause the data of programs to conform to the service quality that was determined, the content of the determinations by broadcast control apparatus 14 is communicated to broadcast apparatus 13.

In order to determine the service quality of each program, broadcast control apparatus 14 both continuously manages programs that are being supplied as output from broadcast apparatus 13 and measures the extent of requests for viewing each program as scores based on the request information that is communicated by viewing request messages from radio terminals 15. These viewing requests may include programs that are being viewed or may include programs that are not being viewed but for which viewing is desired. Broadcast control apparatus 14 then determines the service quality that is to be used in the broadcast of each program according to the score of each program.

More specifically, good service quality should be set to programs in the order of higher scores. If there is a difference between the service quality that is determined based on score and the service quality that is being applied in the broadcast at that time, the service quality of the program is changed. A program that is set to superior service quality has superior picture quality.

Because changes in service quality at excessive frequency due to simple comparison of score magnitude would only be an additional annoyance to users, protection may be implemented to dampen the frequency of change of service quality. For example, the service quality of programs may be set to change if the score of a program for which low service quality is applied exceeds a value obtained by adding a predetermined protection value to the score of a program for which high service quality is applied. Alternatively, the service quality of programs may be set to change if a state in which scores satisfy predetermined conditions for causing change of service quality continues for at least a predetermined protection time.

Gateway apparatus 12 is a gateway for connecting each base station apparatus 11 to a network (not shown).

Figure 2:
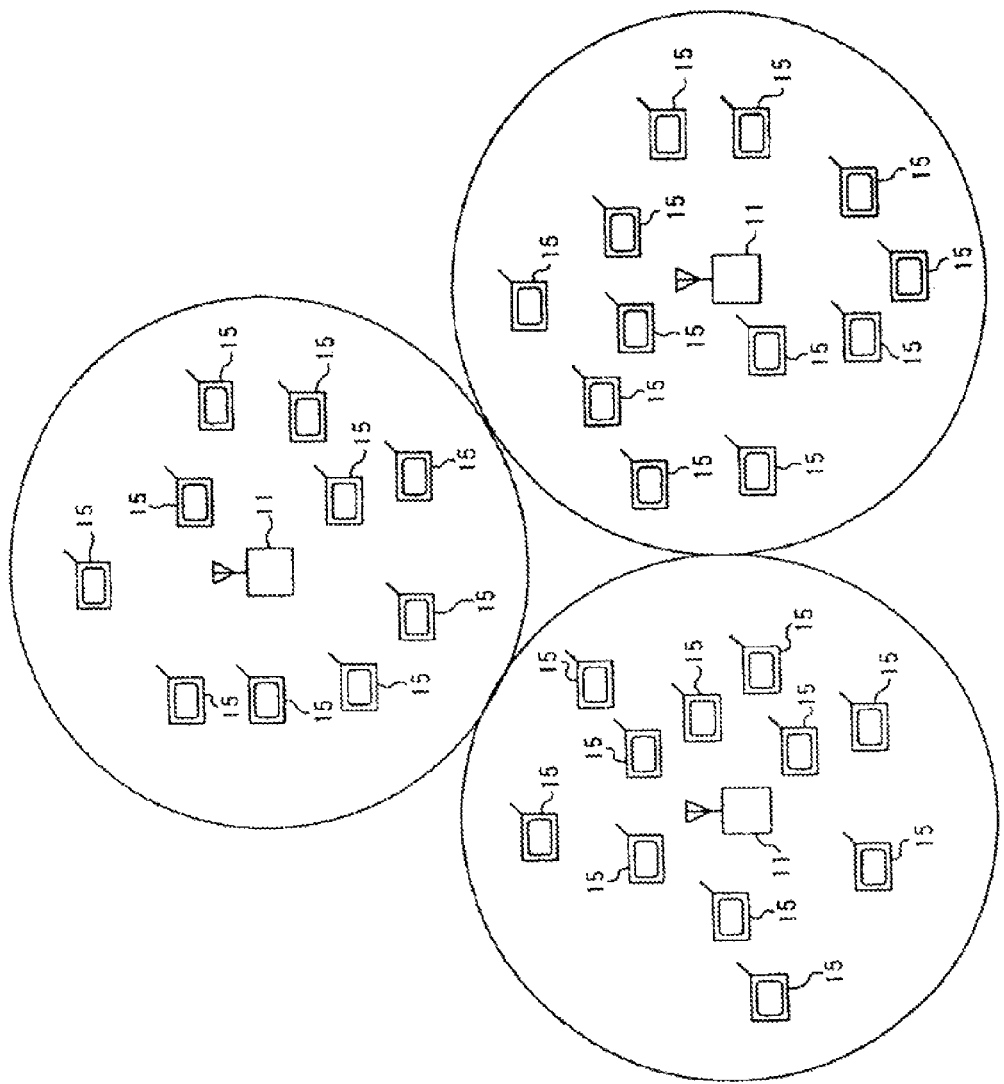
FIG. 2 shows the coverage of a communication area by a plurality of base station apparatuses.

Base station apparatus 11 is a device that transmits data to and receives data from radio terminals 15 by radio channels. As shown in FIG. 2, communication by radio terminals 15 is enabled in a variety of locations by covering the communication area by the cells of a plurality of base station apparatuses 11. Regarding broadcast programs, base station apparatuses 11 broadcast the data of programs by radio channels having transmission rates that accord with the service quality that is determined by broadcast control apparatus 14.

Gateway apparatus 12 manages the assignment of the radio channels of each of base station apparatuses 11 and may implement assignment of radio channels for broadcast programs from broadcast apparatus 13 according to the determinations of broadcast control apparatus 14. In this case, base station apparatuses 11 should broadcast the data of programs by radio channels according to the assignment by gateway apparatus 12.

Figures 3, 4:
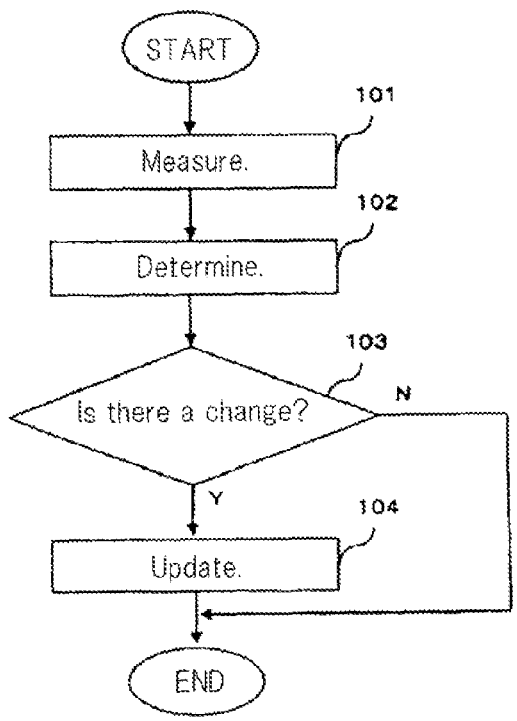
FIG. 3 is a flow chart showing the updating process of broadcast programs by the broadcast system of the present exemplary embodiment.
FIG. 4 is a table showing the state of each program.

FIG. 3 is a flow chart showing the process of updating broadcast programs by the broadcast system of the present exemplary embodiment. Referring to FIG. 3, broadcast control apparatus 14 of the broadcast system measures the scores of each program based on the request information communicated from radio terminals 15 (Step 101).

FIG. 4 is a table showing the state of each program. This table shows an example of the results of score measurement of each program. In this example, the four programs of CH1-4 are supplied from broadcast apparatus 13. The broadcast of CH1 is a baseball relay broadcast and the score is "20." The broadcast of CH2 is a soccer relay broadcast and has a score of "10." CH3 is a tennis relay broadcast and has a score of "8." The broadcast of CH4 is a wrestling relay broadcast, and has a score of "15."

Returning to FIG. 3, broadcast control apparatus 14 next determines which programs to broadcast and the service quality of each program that is broadcast based on the scores of each program (Step 102). If a change occurs in the programs that are to be broadcast, the service quality, or both (YES in Step 103), this change is instructed from broadcast control apparatus 14 to gateway apparatus 12 and the broadcast programs or service quality is updated (Step 104). If no changes occur (NO in Step 103), the process ends without change.

In the example of FIG. 4, the radio band that can be used in the broadcast of programs is assumed to be a radio band that allows broadcast of only three programs at a predetermined service quality (hereinbelow referred to as the "basic rate"). The programs of CH1 and CH4 are being broadcast at the basic rate, and the programs of CH2 and CH3 are being broadcast at a service quality that uses a radio band having one-half the basic rate (hereinbelow referred to as "½ rate"). The service quality of each program is not changed because there is no reversal of scores.

Figure 5:
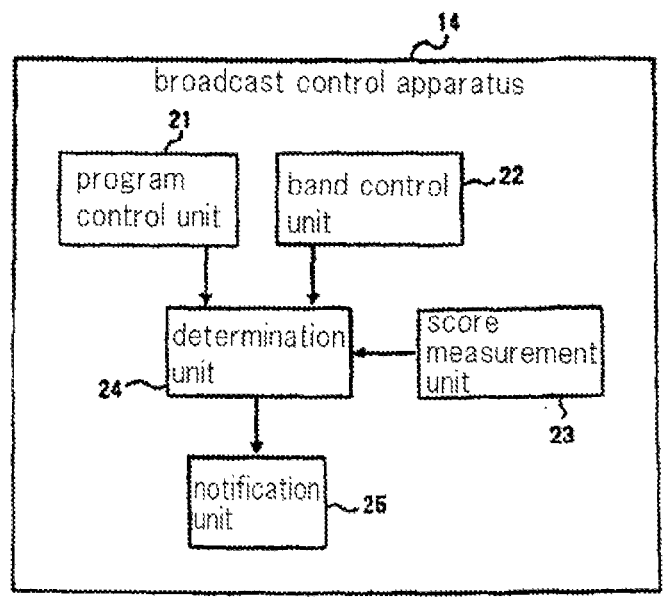
FIG. 5 is a block diagram showing the configuration of broadcast control apparatus 14 of the present exemplary embodiment.

FIG. 5 is a block diagram showing the configuration of broadcast control apparatus 14 of the present exemplary embodiment. Referring to FIG. 5, broadcast control apparatus 14 includes: program control unit 21, band control unit 22, score measurement unit 23, determination unit 24, and notification unit 25.

Program control unit 21 manages information (broadcast information) of programs that are supplied as output from broadcast apparatus 13. Broadcast information includes, for example, the broadcast schedule of programs. The start time and end time of each program is identified.

Band control unit 22 manages the program radio band that can be used for the broadcast of programs. The program radio bands may be fixed values or may be values that change depending on the state of assignment of radio channels in base station apparatuses 11.

Score measurement unit 23 measures the score of each program that is supplied as output from broadcast apparatus 13. The score of each program is counted based on request information that is communicated from radio terminals 15.

For example, regarding programs that are being broadcast, actual viewing may be considered a viewing request and scores may be increased by "1" when a user begins viewing or when radio terminal 15 in which viewing is taking place enters an area. Scores may be decreased by "1" when a user ends viewing or when radio terminal 15 in which viewing is taking place leaves an area.

Regarding programs that are not being broadcast, scores may be increased by "1" when a user implements operations to request viewing, and scores may be decreased by "1" when a user that had requested viewing cancels the request for viewing or requests viewing of another program.

Determination unit 24 determines which programs are to be broadcast and the service quality of each program that is broadcast based on the score of each program such that the total transmission rate of programs that are being broadcast is accommodated within the program radio band. At this time, determination unit 24 may determine the service quality of each program such that all programs can be broadcast, or may determine not to broadcast programs for which scores are low. The determination not to broadcast is equivalent to setting service quality in which the transmission rate is zero. The service quality of each program may be realized by a simple comparison of the magnitude of the scores, or may be protected by applying a protection number to scores or a protection time relating to the timing of switching.

When changes in the broadcast programs or the service quality of each program have been determined by determination unit 24, notification unit 25 notifies base station apparatuses 11 or gateway apparatus 12.

Figure 6:
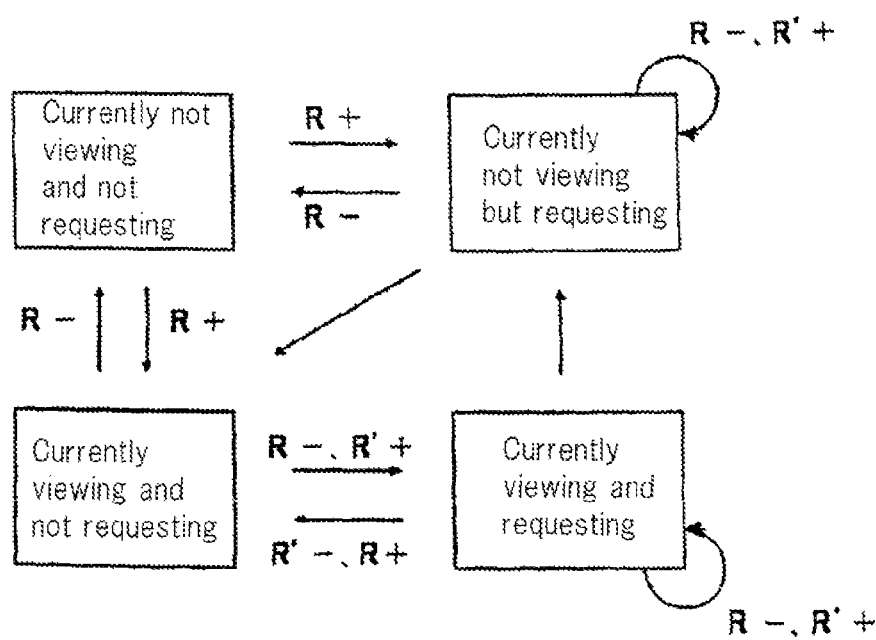
FIG. 6 is a view for explaining how the scores of each program that are measured by score measurement unit 23 are changed by the states of radio terminals 15.

FIG. 6 is a view for describing the manner in which the scores of programs that are measured by score measurement unit 23 are changed by the states of radio terminals 15.

The states of radio terminals 15 include a state in which a program is being viewed, a state in which a program is not being viewed, or, in each of these a states, a state in which a program is requested and a state in which no request is made. In the interest of simplifying the explanation, the above states are referred to as follows: the state in which a program is being viewed is referred to as "currently viewing," and the state in which a program is not being viewed is referred to as "currently not viewing." The state in which another program is being requested is referred to as "currently requesting," and the state in which another program is not being requested is referred to as "not currently requesting."

Combinations of these states are referred to as follows: the state in which a program is not being viewed and a program is not being requested is referred to as "currently not viewing and not requesting," the state in which a program is not being viewed and a program is being requested is referred to as "currently viewing but requesting," the state in which a program is being viewed and another program is not being requested is referred to as "currently viewing and not requesting," and the state in which a program is being viewed and another program is being requested is referred to as "currently viewing and requesting."

When the state of radio terminal 15 changes, the scores of programs change. In addition, the scores of programs in each of the areas of a movement origin and movement destination are changed by the movement between areas of radio terminal 15 having a particular state. The arrows in FIG. 6 show changes in state. In addition, the changes of the scores that accompany state changes are noted close to the arrows. R and R' indicate a program that is being viewed or a program that is being requested, "+" indicates an increase in a score, and "−" indicates a decrease in a score.

To describe the scores in each state, the state of radio terminal 15 that is present in a specific area is first described.

A score is not counted when radio terminal 15 is in the state of currently not viewing and not requesting.

When radio terminal 15 changes from the state of currently not viewing and not requesting to the state of currently viewing and not requesting, the score of the program that is being viewed increases by "1." This is the state in which a user begins viewing the program.

When radio terminal 15 changes from the state of currently viewing and not requesting to the state of currently not viewing and not requesting, the score of the program that was being viewed decreases by "1." This is the state in which viewing ends without a request for a program.

When radio terminal 15 changes from the state of currently not viewing and not requesting to the state of currently not viewing but requesting, the score of the requested program increases by "1." This is the state that is brought about when the user views the terminal display (to be described) and requests a program that he or she wishes to see.

When radio terminal 15 changes from the state of currently not viewing but requesting to the state of currently not viewing and not requesting, the score of the program that was requested decreases by "1." This is a state that is brought about when the user gives up viewing a program that he or she wished to see.

When radio terminal 15 changes from the state of currently viewing and not requesting to the state of currently viewing and requesting, the score of the program that was being viewed decreases by "1," and the score of the program that is requested increases by "1." This is a state that is brought about when the user decides that he or she wishes to view another program. In this case, the program that is currently being viewed is being viewed out of expedience, but from the viewpoint that the user does not truly wish to see the program, the score of the program being viewed is decreased.

When radio terminal 15 changes from the state of currently viewing and requesting to the state of currently viewing but not requesting, the score of the program that was being viewed increases by "1," and the score of the program that was being requested decreases by "1." This is a state in which the user considered viewing a program other than the one he or she is currently viewing but then reconsidered and decided that the program he or she wishes to see is the one currently being viewed.

When radio terminal 15 changes from the state of currently viewing and requesting to the state of currently not viewing but requesting, neither the score of the program that was being viewed nor the score of the program that is requested changes. This is a state in which the user was viewing a program other than a desired program, but because the program that was requested does not start, the user gave up continuing to view the program currently being viewed. At this time, the program that was requested by the user does not change and the score therefore does not change.

When radio terminal 15 changes from the state of currently not viewing but requesting to the state of currently viewing and not requesting, the score of the program that was being requested is the same as the score of the program that was being viewed, and the score does not change. This is a state that is brought about when the user views the terminal display (to be described) and realizes that he or she can view a program that he or she requested or when the inner configuration of radio terminal 15 detects that a program that was requested can be viewed and transitions from the state of currently not viewing to the state of currently viewing. At this time, the program that the user wants to view does not change and the score therefore does not change.

When radio terminal 15 changes the program that is requested in the state of currently viewing and requesting, the score of the program for which a request was canceled is decreased by "1" and the score of the program that is newly requested increases by "1."

When radio terminal 15 changes the program that is requested in the state of currently not viewing but requesting, the score of the program for which the request was canceled decreases by "1" and the score of the program that is newly requested increases by "1."

Figure 7:
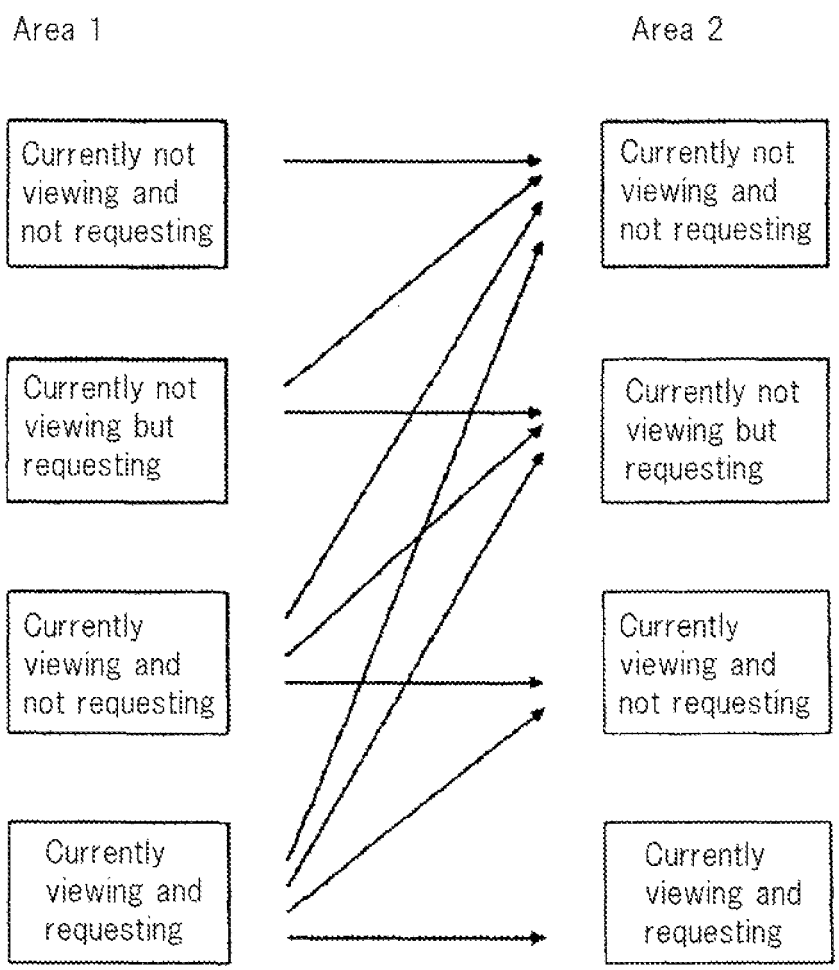
FIG. 7 is a view for explaining how the scores change when radio terminal 15 moves between areas.

Changes in score when radio terminal 15 moves between areas are next described. FIG. 7 is a view for describing how scores change when radio terminal 15 moves between areas. In FIG. 7, the arrows show the transitions in state that accompany movement of radio terminal 15 between areas.

Cases are described in which radio terminal 15 in each of the viewing states and requesting states moves from one area to another. The scores of programs in each of the areas which is the movement origin and movement destination are independent. When radio terminal 15 moves, the score of a program that was being requested in the movement origin area is decreased by the departure of radio terminal 15. In the movement destination area, the score of the program that was being requested in the movement origin area is in some cases increased by the entry of radio terminal 15, but the score of the program is in some case not increased if that program has not been defined in the movement destination area. Assuming that radio terminal 15 moves from area 1 to area 2, the state of radio terminal 15 in area 1 is next described as the four states of: currently not viewing and not requesting, currently not viewing but requesting, currently viewing and not requesting, and currently viewing and requesting another program.

The scores of programs do not change when radio terminal 15 that is currently not viewing and not requesting in area 1 enters area 2.

When radio terminal 15 that was currently not viewing but requesting in area 1 enters area 2, transitions to two states are possible, specifically, the state of currently not viewing and not requesting or the state of currently not viewing but requesting. The reason for changing to currently not viewing and not requesting in area 2 is that a program that was being requested in area 1 cannot be broadcast in area 2. In this case, the score of the program that was being requested in area 1 decreases, and the score of the program in area 2 is not increased. If the states in area 1 and area 2 are the same as currently not viewing but requesting, the score of the program that was being requested in area 1 is decreased and the score of the same program in area 2 is increased.

When radio terminal 15 in the state of currently viewing and not requesting in area 1 enters area 2, transitions to three states are possible, specifically: the state of currently not viewing and not requesting, the state of currently not viewing but requesting, or the state of currently viewing and not requesting. The reason for a transition to currently not viewing and not requesting in area 2 is that the program that was being viewed in area 1 cannot be requested because it is not being broadcast and cannot be broadcast in area 2. In this case, the score of the program that was being viewed in area 1 is decreased, and the score of the program is not increased in area 2. The reason for a transition to currently not viewing but requesting in area 2 is that the program that was being viewed in area 1, although not currently being broadcast in area 2, can be broadcast and therefore can be requested. In this case, the score of the program that was being viewed in area 1 is decreased and the score is increased as the same program is requested in area 2. The reason for a transition to currently viewing and not requesting in area 2 is that the same program as in area 1 can be viewed in area 2. In this case, the score of the program that was being viewed in area 1 is decreased, and the score of the same program in area 2 is increased.

When a terminal that was viewing and requesting in area 1 enters area 2, transitions can be made to four states, specifically: currently not viewing and not requesting, currently not viewing but requesting, currently viewing and not requesting, or currently viewing and requesting. The reason for a transition to the state of currently not viewing and not requesting in area 2 is that the program that was being viewed in area 1 cannot be requested because the program is not being broadcast and cannot be broadcast in area 2. In this case, the score of the program that was being requested in area 1 is decreased, and the score of the program in area 2 is not increased. The reason for a transition to the state of currently not viewing but requesting in area 2 is that the program that was being viewed in area 1 is not being broadcast in area 2 but the program that was being requested in area 1 can be broadcast and the request can be continued. In this case, the score of the program that was being requested in area 1 is decreased and the score is increased as the same program being requested in area 2. The reason for a transition to currently viewing and not requesting in area 2 is that the program that was being viewed in area 1 is being broadcast in area 2 but the program that was being requested cannot be broadcast. In this case, the score of the program that was being requested in area 1 is decreased, and the program that is being viewed in area 2 is increased as being requested. One more reason for a transition to currently viewing and not requesting in area 2 is that because the program that was being viewed in area 1 is not being broadcast in area 2 and the program that was being requested can be broadcast, the program that was being requested is set for viewing. In this case, the score of the program that was being requested in area 1 is decreased, and the score of the program is not increased in area 2.

According to the present exemplary embodiment as described hereinabove, the extent of viewing or the extent of requests for viewing for a plurality of programs is measured as scores and the service quality of each program then updated based on the scores. Accordingly, a limited radio band can be effectively used to enable both the broadcast of programs for which requests from users are comparatively few and the broadcast of programs for which there are many requests at high service quality.

In the broadcast system of the present exemplary embodiment, scores of programs that have been measured in broadcast control apparatus 14 may each be communicated to radio terminals 15 by way of radio access network 16 as report information. In this case, the measurement results of score measurement unit 23 should be reported by notification unit 25 by, for example, broadcast. If radio terminals 15 perform screen display of the state of each program based on the report information, a user is able to learn the state of the program that he or she is viewing and programs that he or she has requested viewing. The state of a program may be information that includes the scheduled start and end of the broadcast or may be the scores of the program.

In the present exemplary embodiment, it was assumed that broadcast control apparatus 14 is arranged outside radio access network 16 and that determinations were communicated from there to radio access network 16. However, the present invention is not limited to this form. As another example, broadcast control apparatus 14 may be incorporated in gateway apparatus 12 or base station apparatus 11.

Although broadcast apparatus 13 and broadcast control apparatus 14 were described as separate devices in the present exemplary embodiment, the present invention is not limited to this form. Broadcast apparatus 13 and broadcast control apparatus 14 may be configured as a single unit.

Working examples of greater specificity are next described.

The broadcast system of the present working example has a configuration such as shown in FIG. 1, and a plurality of base station apparatuses 11 are arranged as shown in FIG. 2.

Figure 8:
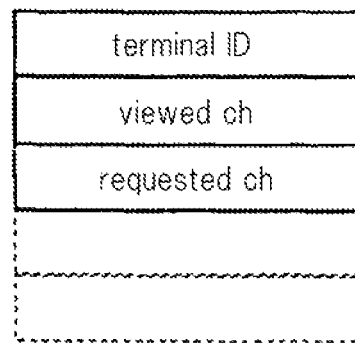
FIG. 8 shows the format of a viewing request message that is transmitted from radio terminal 15.

In the present working example, report information that is communicated from radio terminal 15 includes the channel that a user is actually viewing (viewed channel) and a channel that a user wishes to view (requested channel). FIG. 8 is a view showing the format of the viewing request messages that are sent from radio terminal 15. Referring to FIG. 8, the viewing request messages are of a format that allows communication of the viewed channel (viewed ch) and requested channel (requested ch) together with the terminal ID (identifier) as report information. The viewed state and requested state of a program by the user of radio terminal 15 are communicated by means of a viewing request message from radio terminal 15. The content of a viewing request message has a pattern such as shown below:

(1) When a certain broadcast program is being viewed and the same broadcast program is being requested: viewed ch="viewed ch"; and requested ch="not designated" or "viewed ch"
(2) When a certain broadcast is being viewed and another program is being requested: viewed ch="viewed ch"; and requested ch="requested ch"
(3) When a program is not being viewed and there is no request for viewing: viewed ch="not designated"; and requested ch="not designated"
(4) When a program is not being viewed and the viewing of a program is being requested: viewed ch="not designated"; and requested ch="requested ch"

Figure 9:
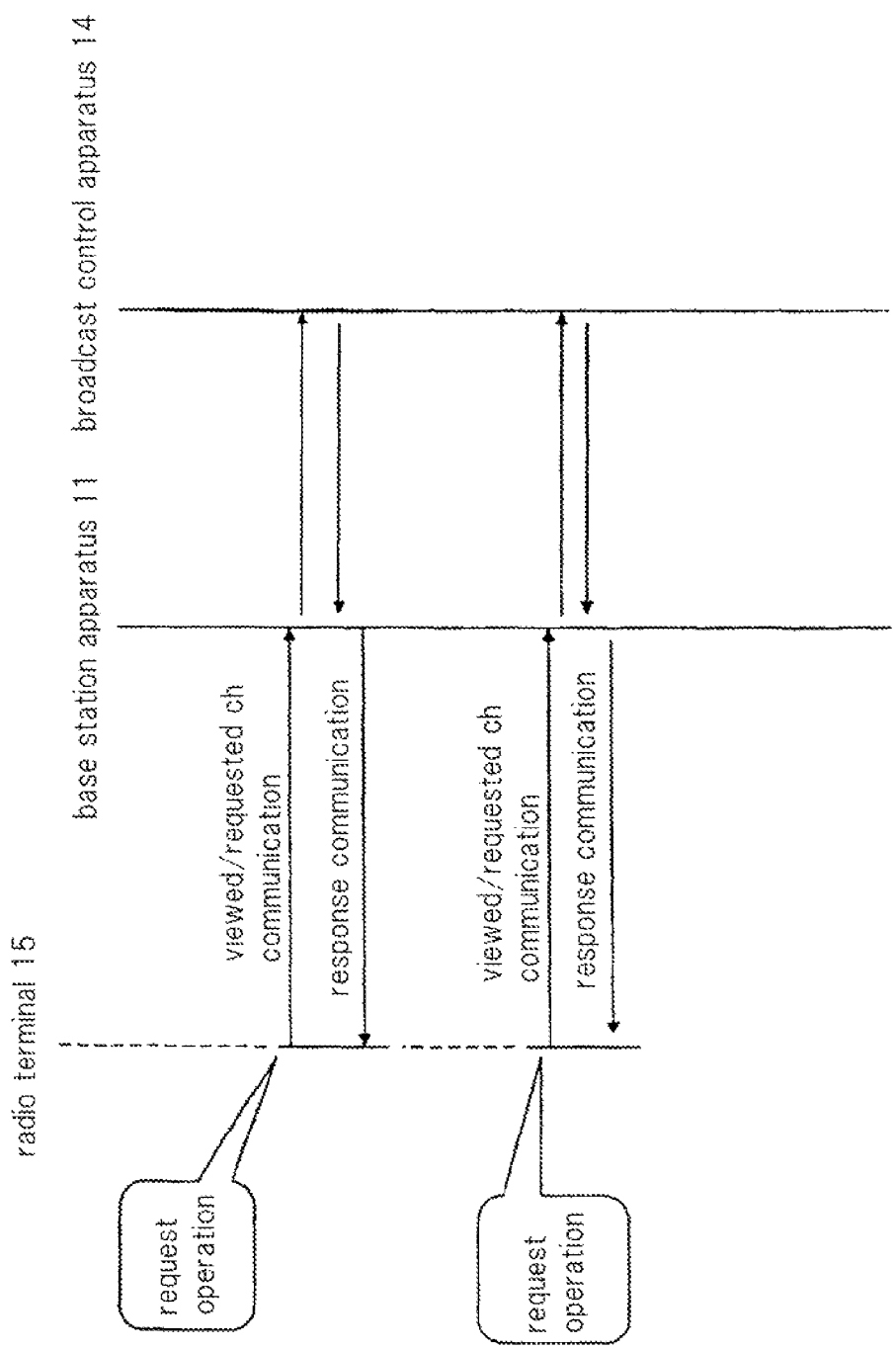
FIG. 9 is an example of a signal sequence between a radio terminal and a base station apparatus when a user updates a requested ch.

FIG. 9 is an example of the signal sequence between a radio terminal and a base station apparatus when a user updates the requested ch. For example, when the user transitions from a state of not viewing to a state of viewing, changes the requested channel, or cancels a request to view a program, updating is carried out to designate or to cancel a requested channel. Referring to FIG. 9, a request operation submitted to radio terminal 15 by a user is taken as the call to communicate the viewed channel and the requested channel. This notification is reported by the viewing request message shown in FIG. 8.

In a state in which a user is viewing a broadcast program, cases can occur in which a program is requested that differs from the program that is currently being viewed, in which the request for a program that is currently requested is canceled, or in which no program is requested. When no program is requested, the program that is being viewed can be considered as requested.

Figure 10:
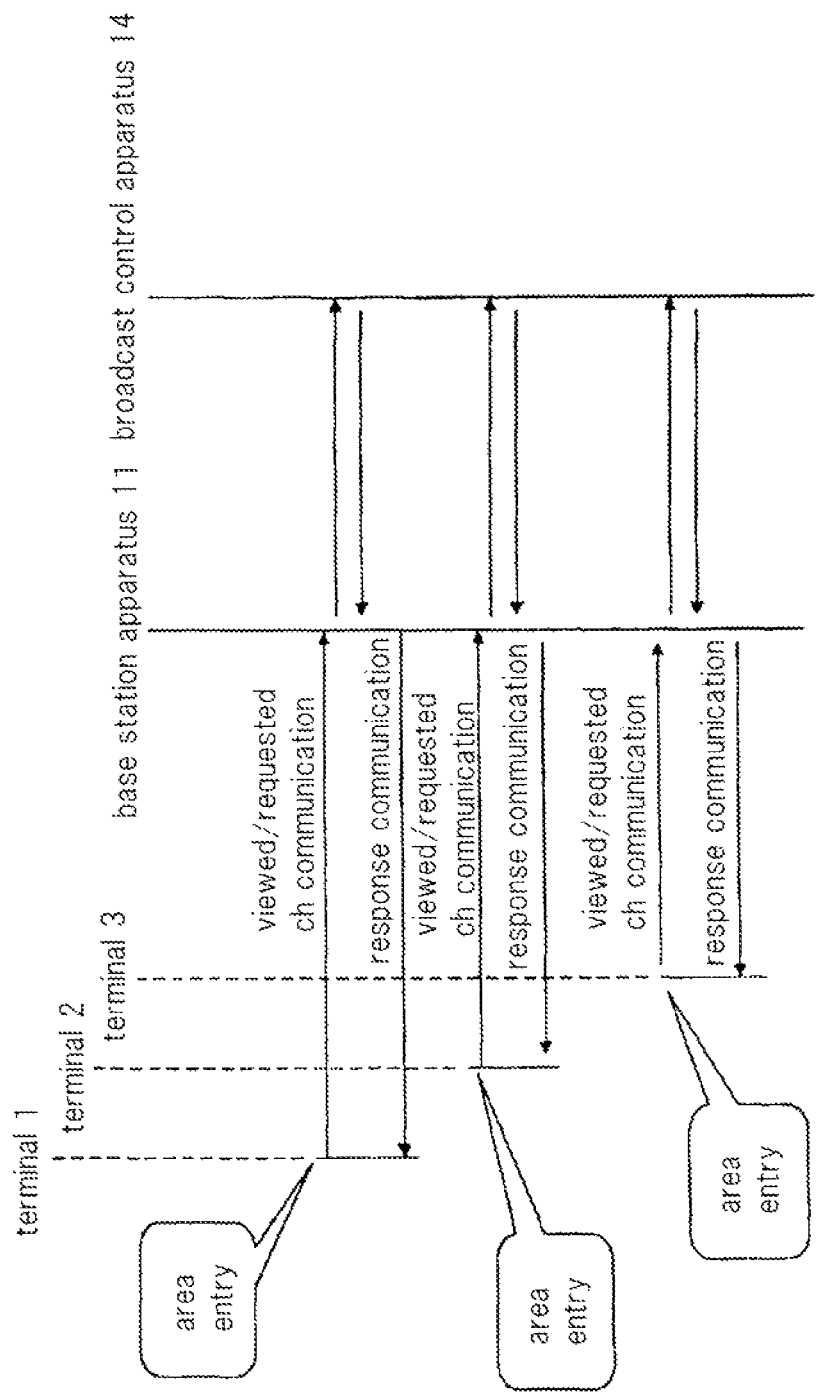
FIG. 10 is an example of a signal sequence between a radio terminal and a base station apparatus when the radio terminal in the state of viewing a particular broadcast program enters the coverage area of a base station apparatus.

FIG. 10 is an example of a signal sequence between a radio terminal and a base station apparatus when a radio terminal that is in the state of viewing a particular broadcast program enters the coverage area of the base station apparatus. This signal sequence is the same as the sequence when a radio terminal that is in the state of not viewing a broadcast program begins viewing a particular broadcast program. Referring to FIG. 10, triggered by the entry into the area, radio terminals #1-#3 communicate viewed channels and requested channels. The notification of viewed channels and requested channels is transferred by the viewing request message shown in FIG. 8.

When radio terminal 15 enters the coverage area of a particular base station apparatus 11 from outside the coverage area, the channel of the program that is currently being viewed is reported as the viewed channel and the channel of the program that is currently being requested is reported as the requested channel. Radio terminal 15 automatically sends the viewing request message even if the user does not carry out any operations on radio terminal 15.

At this time, if a program in a state of not being broadcast in the coverage area of base station apparatus 11 in which radio terminal 15 was previously located and that was requested by the user is being broadcast in the coverage area of base station apparatus 11 that was newly entered, radio terminal 15 may automatically switch the viewed channel. Alternatively, radio terminal 15 may inform the user by display, speech output, or by an alarm that the requested program can now be viewed. In this way, the user can automatically begin viewing a desired broadcast program without being aware of movement between base station apparatuses 11.

Alternatively, when the user of radio terminal 15 that is not viewing a program begins viewing a broadcast, radio terminal 15 transfers a message communicating the viewed channel and requested channel simultaneous with or at a fixed time interval after the user selects the received program and radio terminal 15 begins reception operations.

Figure 11:
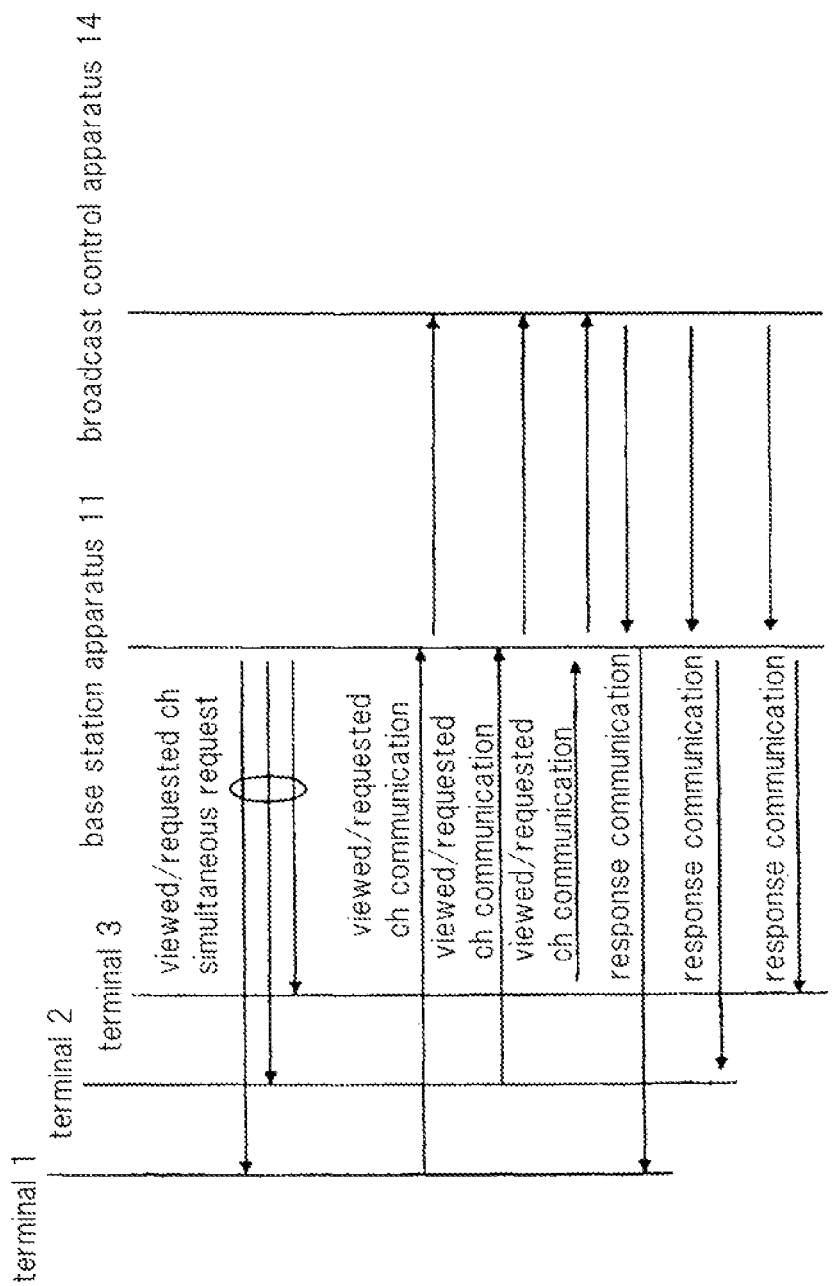
FIG. 11 is a signal sequence when a request is submitted from the system side to radio terminals in the coverage area of a base station apparatus to collect information of viewed channels and requested channels.

FIG. 11 is a signal sequence when a request is submitted from the system side to a radio terminal in the coverage area of a base station apparatus to collect information of the viewed channel and requested channel. In this example, request messages are sent all at once from base station apparatus 11 using a common channel that each radio terminal 15 can receive, and each of radio terminals #1-#3 transmits to broadcast control apparatus 14 by way of base station apparatuses II the viewed channels and requested channels in response to these request messages.

In order to circumvent the congestion that occurs at base station apparatuses 11 or broadcast control apparatus 14 due to the messages from radio terminals 15 at this time, radio terminals 15 in the coverage areas of base station apparatuses 11 may be divided into several groups and request messages may be transmitted all at once at different times for each group.

FIG. 12 is an example of the state of viewing and requests of programs by each of the radio terminals in the coverage areas of base station apparatuses at a particular time. Here, the programs that can be broadcast in the coverage areas of base station apparatuses 11 are the four categories of channels 1-4. The programs that are actually being broadcast are the two programs of channel 1 and channel 4, and the programs that are not being broadcast are the two programs of channel 2 and channel 3.

For example, radio terminals 15 of terminal IDs=1-19 are in the state of currently viewing channel 1 and not requesting other channels. Radio terminals 15 of terminal IDs=20-22 are in the state of currently viewing channel 1 and requesting channel 2. These correspond to states in which viewing of channel 2 was originally desired, but because channel 2 is not broadcast, channel 1 is being viewed. In addition, radio terminal 15 of terminal ID=26 is in a state of currently viewing channel 1 and requesting channel 4. This corresponds to a state in which viewing of channel 4 was originally desired but channel 1 is being viewed temporarily. In addition, radio terminals 15 of terminal IDs=51-55 are in the state of currently not viewing any program, and further, requesting channel 2.

Figure 13:
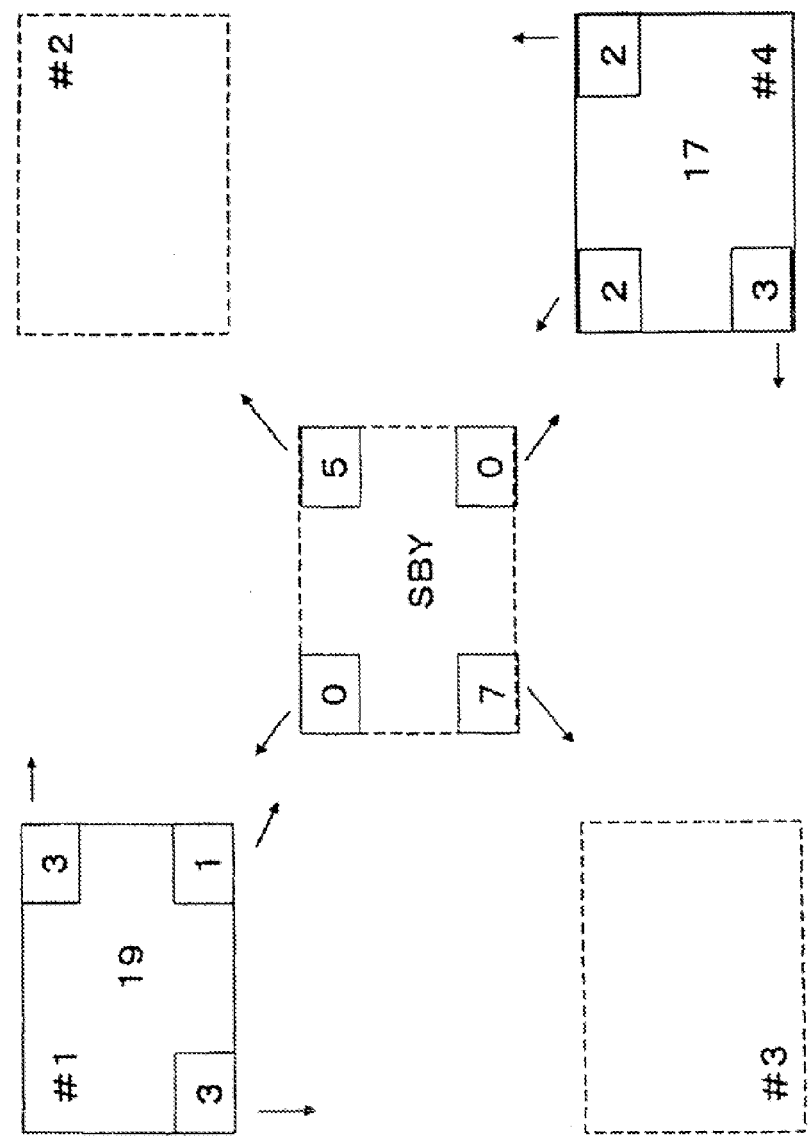
FIG. 13 gives a schematic representation of the states of FIG. 12.

FIG. 13 gives a schematic representation of the states of FIG. 12. In this figure, four programs that can be broadcast are shown in frames #1-#4. The frames in solid lines show programs that are actually being broadcast, and the frames in dotted lines show programs in the state of not being broadcast. #1 and #4 are being broadcast, and #2 and #3 are not being broadcast.

Focusing on the #1 frame, it can be seen that there are 19 radio terminals 15 that are currently viewing the program of #1 and not requesting another program. In addition, there are three radio terminals 15 that are currently viewing the program of #1 and further requesting the program of #2. There are three radio terminals 15 that are currently viewing the program of #1 and further requesting the program of #3. There is one radio terminal 15 that is currently viewing the program of #1 and further requesting the program of #4.

Similarly focusing on the frame of #4, it can be seen that there are 17 radio terminals 15 that are currently viewing the program of #4 and not requesting another program. There are two radio terminals 15 that are currently viewing the program of #4 and further requesting the program of #2. There are three radio terminals 15 that are currently viewing the program of #4 and further requesting the program of #3. There are two radio terminals 15 that are currently viewing the program of #4 and further requesting the program of #1.

Referring to the dotted-line frame in the center, there are five radio terminals 15 that are not viewing any programs and that are requesting the program of #2. There are seven radio terminals that are not viewing any program and that are requesting the program of #3.

Figure 14:
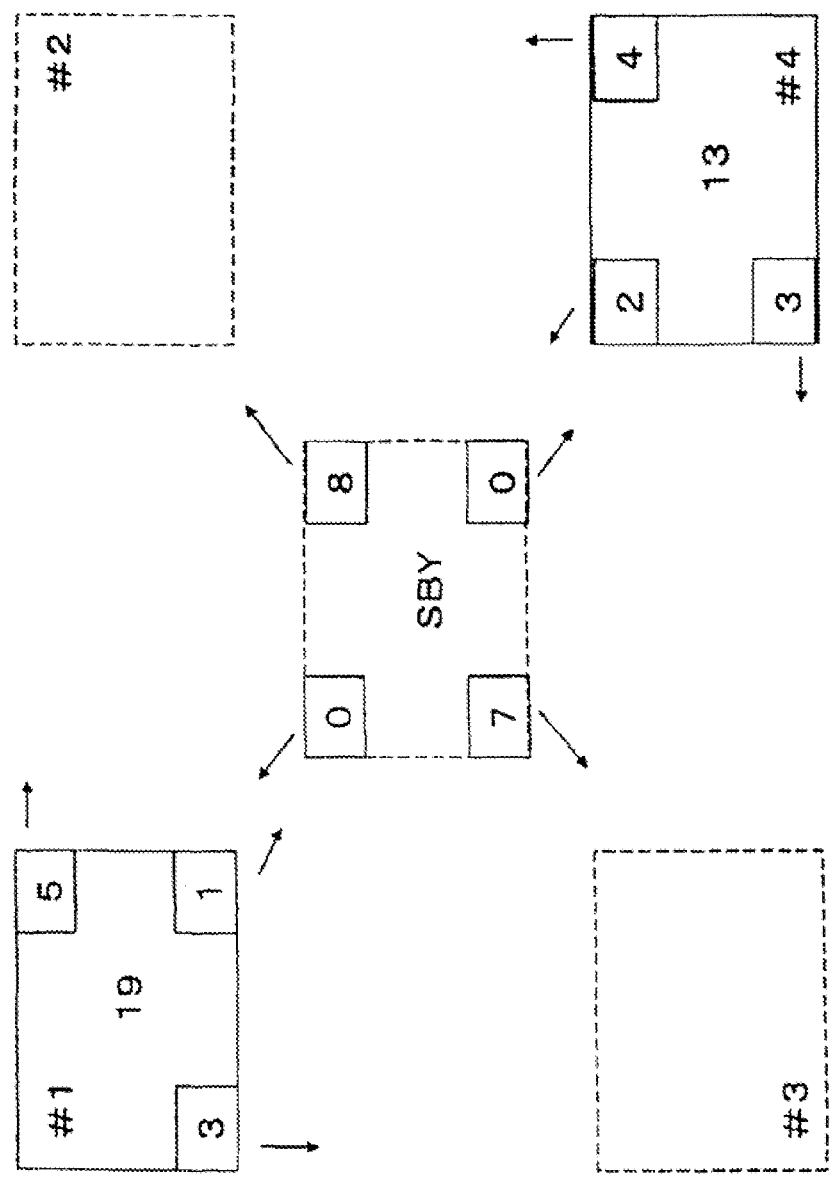
FIG. 14 shows the states following the passage of a fixed time interval after the state of FIG. 13.

FIG. 14 shows the state after the passage of a fixed time interval from the state of FIG. 13.

Looking for example at the frame of #1, the existence of 19 radio terminals 15 that are currently viewing the program of #1 and not requesting another program has not changed from the state of FIG. 13. However, the number of radio terminals 15 that are currently viewing the program of #1 and further requesting the program of number 2 has increased to five.

Similarly looking at #4, the number of radio terminals 15 that are currently viewing the program of #4 and not requesting another program has decreased to 13. In addition, the number of radio terminals 15 that are currently viewing the program of #4 and further requesting the program of #2 has increased to four.

FIG. 15 shows the state shown in FIG. 13 in table format. FIG. 16 is a table in which the table of FIG. 15 has been reordered.

Referring to FIG. 16, the program of #1 is being viewed by 19 radio terminals 15, and is further being requested. The program of #1 is being requested from two radio terminals 15 that are currently viewing the program of #4.

The program of #2 is being requested from three radio terminals 15 that are currently viewing the program of #1, is being requested from two radio terminals 15 that are currently viewing the program of #4, and is being requested from five radio terminals 15 that are currently not viewing any program.

The program of #3 is being requested from three radio terminals 15 that are currently viewing the program of #1, is being requested from three radio terminals 15 that are currently viewing the program of #4, and is being requested from seven radio terminals 15 that are currently not viewing any program.

The program of #4 is being viewed by 17 radio terminals 15, and further is being requested. The program of #4 is further being requested from one radio terminal 15 that is currently viewing the program of #1.

FIG. 17 shows the state shown in FIG. 13 in table format. FIG. 18 is a table in which the table of FIG. 17 has been reordered.

Referring to FIG. 18, the program of #1 is currently being viewed in 19 radio terminals 15 and is further being requested. In addition, the program of #1 is being requested by two radio terminals that are currently viewing the program of #4.

The program of #2 is being requested from five radio terminals 15 that are currently viewing the program of #1, is being requested from four radio terminals 15 that are currently viewing the program of #4, and is being requested from eight radio terminals 15 that are currently not viewing any program.

The program of #3 is being requested from three radio terminals 15 that are currently viewing the program of #1, is being requested from three radio terminals 15 that are currently viewing the program of #4, and is being requested from seven radio terminals 15 that are currently not viewing any program.

The program of #4 is being viewed by 13 radio terminals 15, and is further being requested. In addition, the program of #4 is being requested from one radio terminal 15 that is currently viewing the program of #1.

In the present working example, the score of each program is calculated by Equation (1).

$$(\text{score}) = (\text{viewing number}) + (\text{requesting number}) - (\text{number requesting other channels}) \quad (1)$$

The viewing number is the number of radio terminals 15 that are actually viewing the program. The requesting number is the number of radio terminals 15 that are requesting the program. The number requesting other channels is the number of radio terminals 15 that are currently viewing that program and further requesting another program.

These scores are indices indicating the programs for which viewing is desired regardless of whether the users of radio terminals 15 are actually viewing or not. Selecting programs based on these scores enables the selection and broadcast of programs that are truly being requested.

FIG. 19 is a view for describing the process of computing the scores of each program in the state of FIG. 13 (and FIGS. 15 and 16). FIG. 20 is a view for describing the process of computing scores of each program in the state of FIG. 14 (and FIGS. 17 and 18). FIG. 21 is a table showing the scores of each program in the state of FIG. 13. FIG. 22 is a table showing the scores of each program in the state of FIG. 14.

For example, in the state of FIG. 13, the viewing number is a value obtained by vertically adding the number of reports in FIG. 15. The requested number is the number of reports obtained by subtracting the reports from radio terminals 15 that are currently viewing that program from the reports requesting the program shown in FIG. 16. The number requesting other channels is the number of reports requesting other programs among the reports from radio terminals 15 that are viewing that program shown in FIG. 15.

The scores computed by Equation (1) show the extent to which the viewing of each program is being requested from the users of radio terminals 15. Broadcast control apparatus 14 selects programs that are broadcast on radio channels in order from the program for which viewing is requested from the most users.

More specifically, it is assumed that the states of viewing and requesting at a particular time are analyzed as shown in FIGS. 15 and 16 and scores are computed as shown in FIG. 19. At this point in time, the score (number of votes) of program of #1 is "21," the score of program of #2 is "10," the score of program of #3 is "13," and the score of program of #4 is "18," as shown in FIG. 21.

Subsequently, analysis is carried out as shown in FIGS. 17 and 18 after the passage of a fixed time interval and scores are computed as shown in FIG. 20. At this point in time, as shown in FIG. 22, the score of program of #1 remains unchanged at "21," the score of program of #2 increases to "17," the score of program of #3 remains unchanged at "13," and the score of program of #4 decreases to "14." As a result, the scores of program of #2 and program of #4 hive reversed, and the viewing requests for program of #2 have surpassed the viewing requests for program of #4. Broadcast control apparatus 14 therefore performs switching to halt the broadcast of program of #4 and in its place begin the broadcast of program of #2.

In the present working example, broadcast control apparatus 14 makes the display quality of the images of each program differ according to the scores of each program. In the broadcast system of the present working example, a plurality of types of radio channels having different attributes are prepared, and a radio channel that corresponds to the display quality determined by the score is assigned to each program. More specifically, basic-rate channels and partial-rate channels are prepared as the radio channels that distribute the content of programs. The information rate of a partial-rate channel is lower than the information rate of a basic-rate channel.

Figure 23:
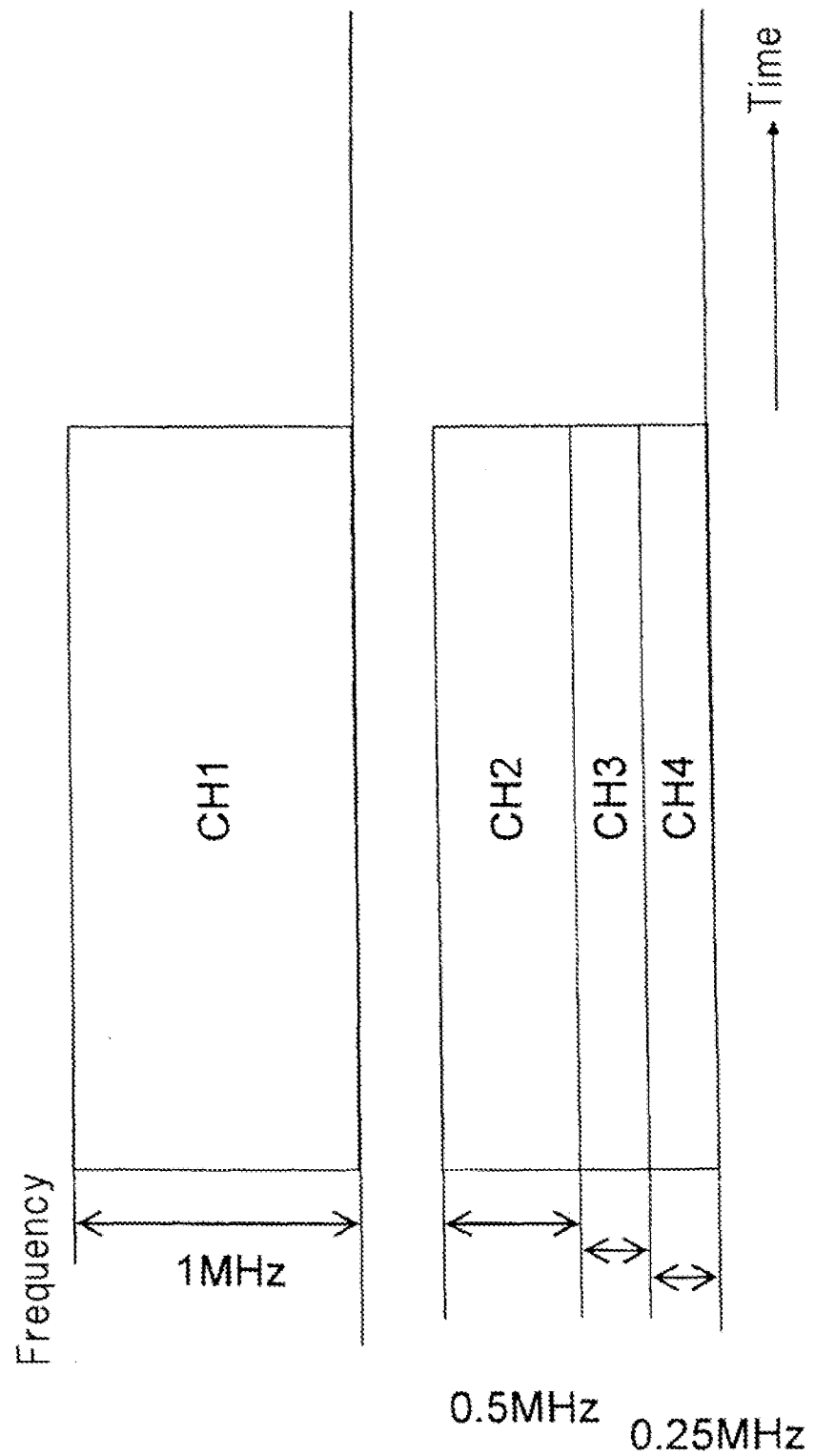
FIG. 23 is a view for describing, an example of the configuration of radio channels in the present working example.
Figure 24:
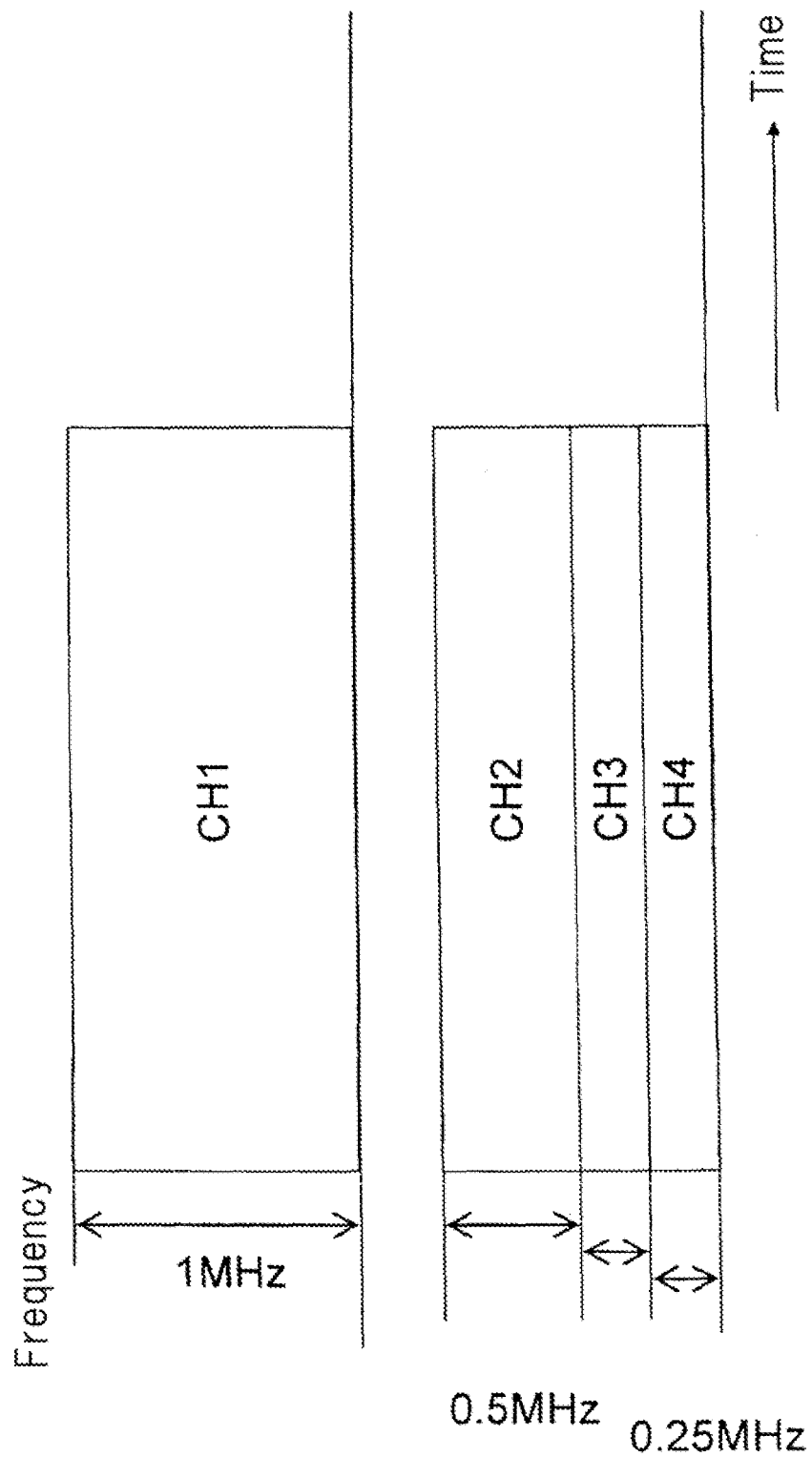
FIG. 24 is a view for describing an example of the configuration of radio channels in the present working example.
Figure 25:
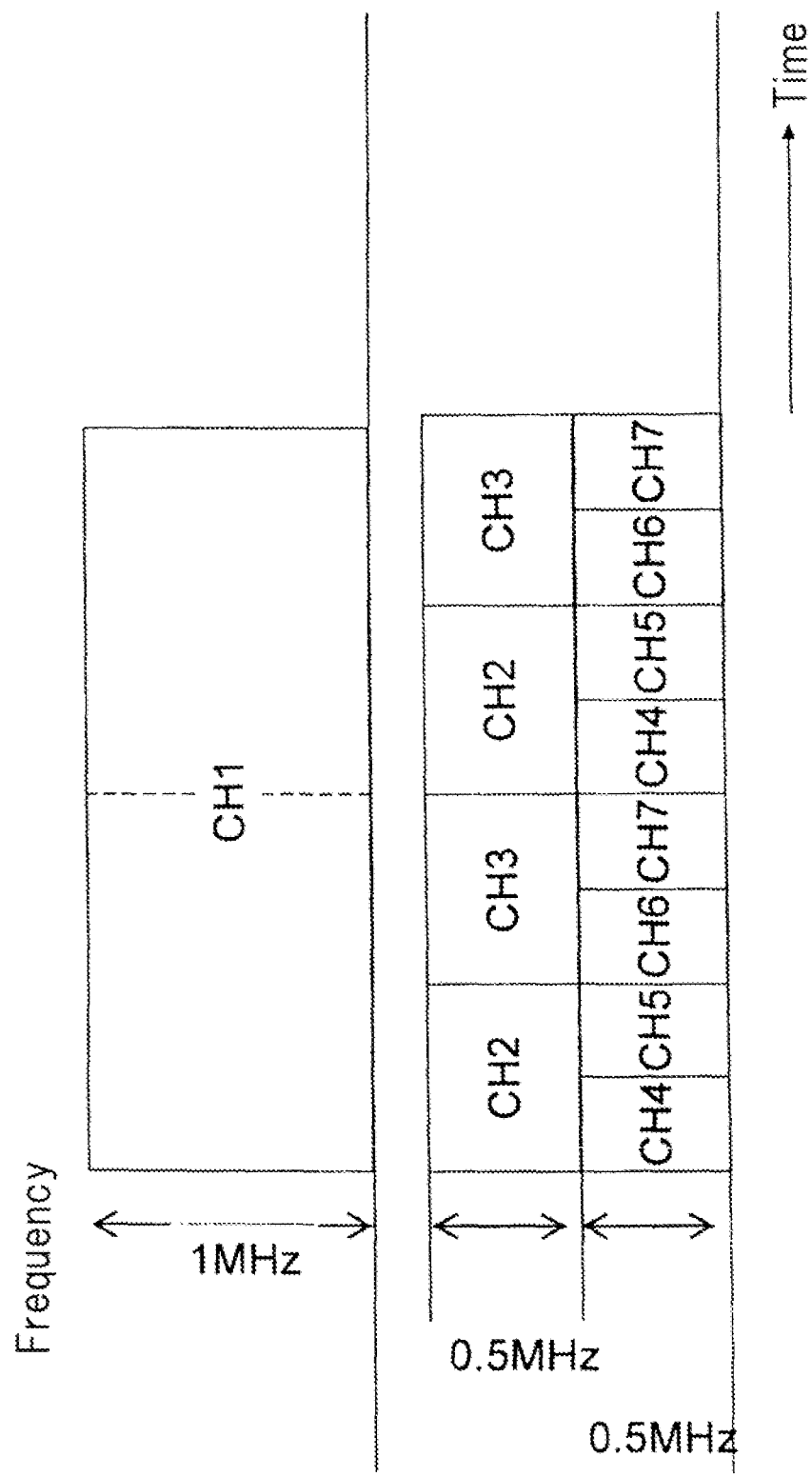
FIG. 25 is a view for describing an example of the configuration of radio channels in the present working example.

FIGS. 23-25 are views for describing examples of the configuration of radio channels in the present working example. A radio band is divided by frequency, by time, or by both to form radio channels having different information transfer rates.

A basic-rate channel is a radio channel having an information transfer rate that serves as a standard. A radio channel having an information transfer rate in which the band of a basic-rate channel has been divided is a partial-rate channel or a sub-rate channel. Among partial-rate channels, a radio channel having an information transfer rate that is one-half that of a basic-rate channel is a ½-rate channel, and a radio channel having an information transfer rate that is one-fourth that of a basic-rate channel is a ¼-rate channel.

In the example shown in FIG. 23, radio channels having narrow bands are formed by dividing a radio channel along the frequency axis. The basic-rate channel is a radio channel having the width of 1 MHz of frequency. In this example, CH1 is a basic-rate channel. The radio channel of CH1 has a fixed information transfer rate such as an information transfer rate of 1 Mbps.

A partial-rate channel having a frequency width of 0.5 MHz, which is one half the frequency width of 1 MHz, is a ½-rate channel. CH2 is a ½-rate channel. A partial-rate channel having a frequency width of 0.25 MHz, which is one-fourth the frequency width of 1 MHz, is a ¼-rate channel. CH3 and CH4 are ¼-rate channels.

The information transfer rate of CH2 is one-half the information transfer rate of CH1, i.e., 0.5 Mbps. In addition, the information transfer rates of CH3 and CH4 are one-fourth the information transfer rate of CH1, or 0.25 Mbps.

In this example, one basic-rate channel is divided into one ½-rate channel and two ¼-rate channels, but one basic-rate channel can also be divided into two ½-rate channels or divided into four ¼-rate channels.

In the example of FIG. 24, radio channels having narrow bands are formed by dividing a radio channel along the time axis. A radio channel having a frequency band of 1 MHz is the basic-rate channel. In this example, CH1 is a basic-rate channel. The radio channel of CH1 has a fixed information transfer rate such as an information transfer rate of 1 Mbps.

A partial-rate channel having a time share of one-half that of a basic-rate channel is a ½-rate channel. In this example, CH2 is a ½-rate channel. A partial-rate channel having one-fourth the time share of the basic-rate channel is a ¼-rate channel. In this example, CH3 and CH4 are ¼-rate channels.

In this example, as in the example of FIG. 23, the information transfer rate of CH2 is one-half the information transfer rate of CH1, or 0.5 Mbps. The information transfer rates of CH3 and CH4 are one-fourth the information transfer rate of CH1, or 0.25 Mbps.

In the example of FIG. 25, radio channels having narrow bands are formed by dividing a radio channel along the frequency axis and time axis. A radio channel having a frequency band of 1 MHz is the basic-rate channel. In this example, CH1 is a basic-rate channel. The radio channel of CH1 has a fixed information transfer rate such as an information transfer rate of 1 Mbps.

Here, CH2 and CH3 are partial-rate channels having one-half the frequency width and one-half the time share of a basic-rate channel. CH4-CH7 are partial-rate channels having one-fourth the frequency width and one-fourth the time share of a basic-rate channel.

The information transfer rates of CH2 and CH3 are one-eighth the information transfer rate of CH1, or 0.125 Mbps. In addition, the information transfer rates of CH4-CH7 are one-sixteenth the information transfer rate of CH1, or 0.0625 Mbps.

Figure 26:
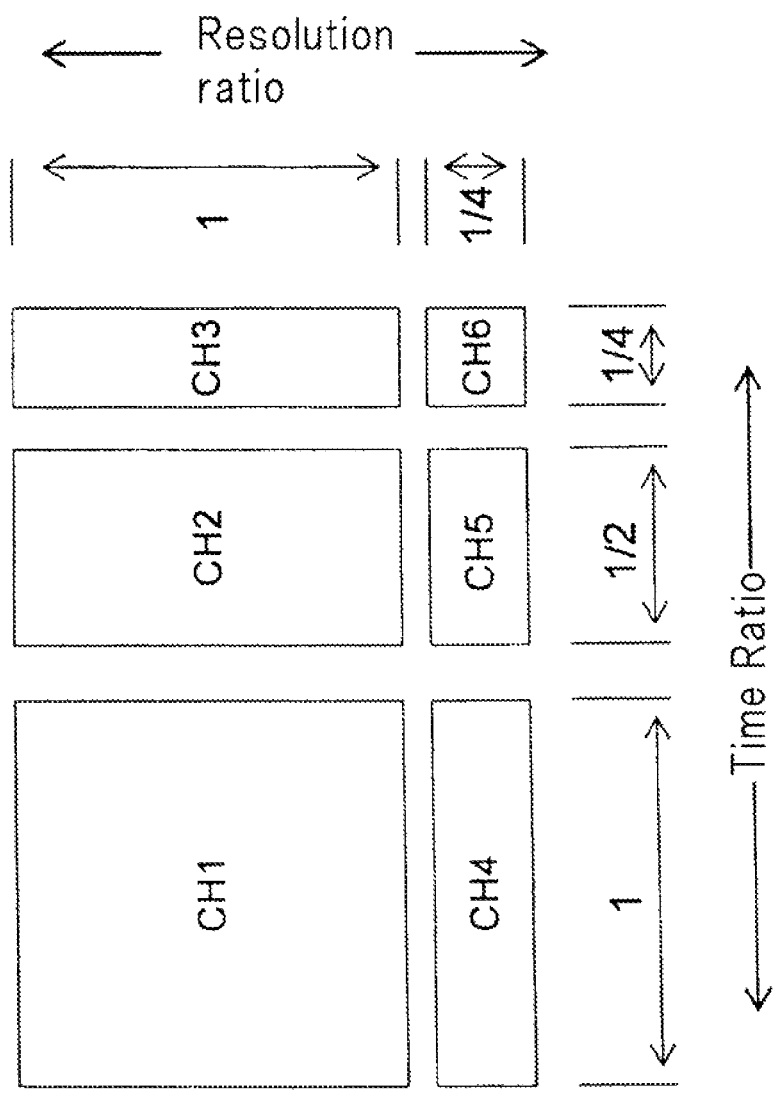
FIG. 26 is a view for explaining service quality for each radio channel.

FIG. 26 is a view for describing the service quality of each radio channel. Here, for the sake of convenience, the service quality of a basic-rate channel is assumed to be a resolution of 480×640 pixels and a frame-per-second rate of 24 frames. In FIG. 26, CH1 is a basic-rate channel. CH2 has the same resolution as CH1 and one-half the frames-per second rate of CH1, or 12 frames. CH3 has the same resolution as CH1 and one-fourth the frames-per-second rate of CH1, or 6 frames. CH4 has one-fourth the resolution of CH1, or 240×320 pixels, and the same frames-per-second rate of 24 frames as CH1. CH5 has the same resolution as CH4 and one-half the frames-per-second rate of CH1, or 12 frames. CH6 has the same resolution as CH4, or 240×320 pixels, and has one-fourth the frames-per-second rate of CH1, or 6 frames.

Accordingly, the image quality of CH2 is one-half the image quality of CH1. The image quality of CH3 and CH4 is one-fourth the image quality of CH1. The image quality of CH5 is one-eighth the image quality of CH1, and the image quality of CH6 is one-sixteenth the image quality of CH1.

In the broadcast system of the present working example, broadcast control apparatus 14 updates the display quality of each program according to the score of each program, and base station apparatuses 11 broadcast the data of each program by radio channels having an image transfer rate that corresponds to the display quality. Accordingly, a limited radio band can be effectively used, and the assignment of radio channels can be updated such that programs having comparatively low demand from users are broadcast at low display quality and programs having high demand are broadcast at high display quality.

The state of display and changes in display realized by radio terminals 15 of the present working example are next described.

For example, when each program has scores such as shown in FIG. 21 and the radio band for programs that can be used in program broadcasting is three basic-rate channel portions, the two programs having high scores should be broadcast by basic-rate channels and the remaining two programs should be broadcast by ½-rate channels.

FIG. 27 shows an example of the state display by radio terminal 15 in the score state shown in FIG. 21. Referring to FIG. 27, display quality (status), program content (program), score (vote) and request state (Req) are displayed as the states of each of the programs of CH1 CH4. The display quality of CH1 and CH4 is "Full Viewing." "Full Viewing" indicates display quality that corresponds to a basic-rate channel. The display quality of CH2 and CH3 is "Half Viewing." "Half Viewing" indicates display quality that corresponds to a ½-rate channel. By looking at this state display, the user is able to learn the display quality of each program. The score of CH1 is 21, the score of CH2 is 10, the score of CH3 is 13, and the score of CH4 is 18. In addition, CH2 is being requested.

Figure 28:
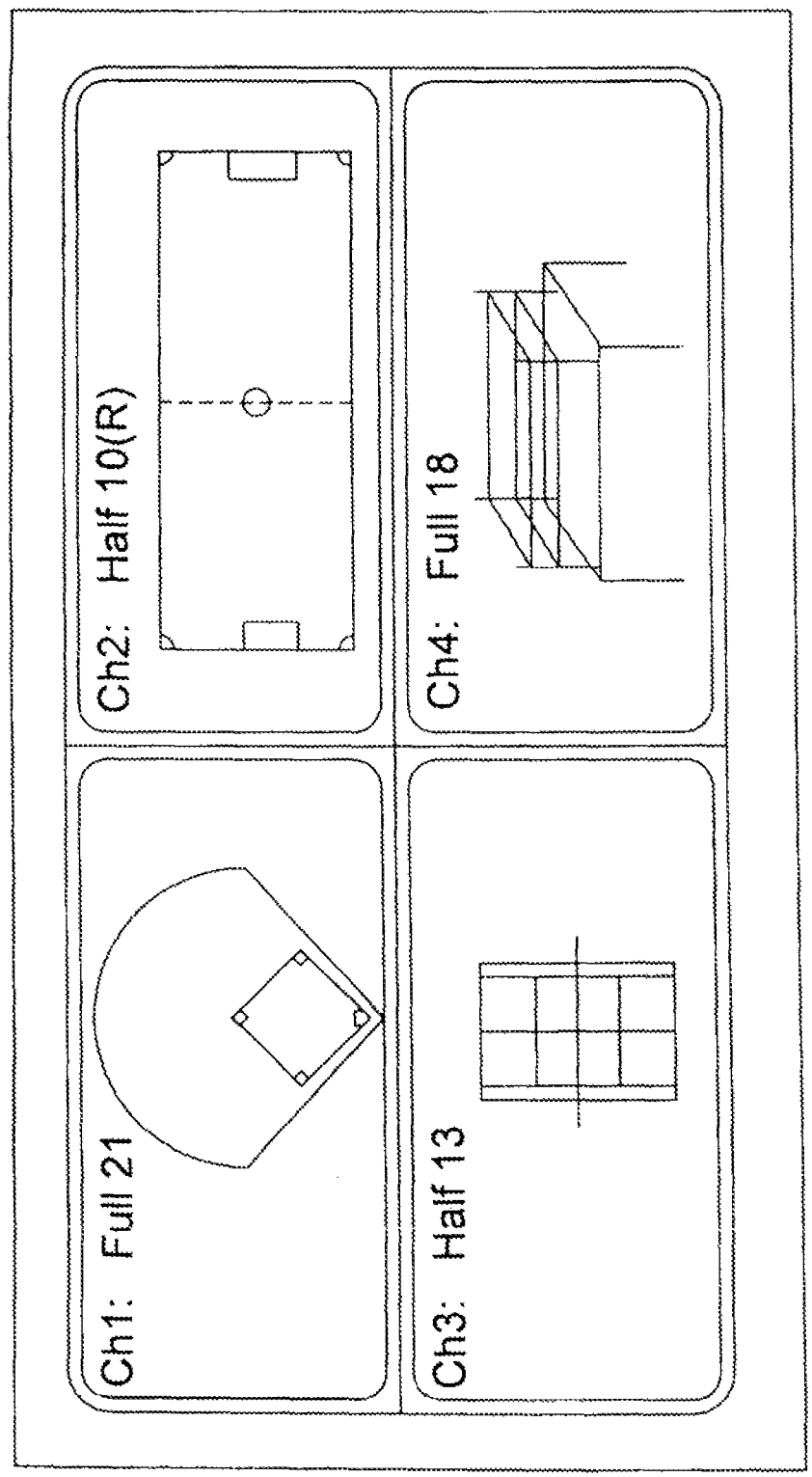
FIG. 28 shows another example of the state display by radio terminal 15 in the score state shown in FIG. 21.

FIG. 28 shows another example of the state display by radio terminal 15 in the score state shown in FIG. 21. Referring to FIG. 28, the display quality, score, and request state are displayed as the state of each program superposed over the images of each of the programs of CH1-CH4. The display quality of CH1 and CH4 is "Full." "Full" indicates that the display quality corresponds to a basic-rate channel. The display quality of CH2 and CH3 is "Half" "Half" indicates that the display quality corresponds to a ½-rate channel. By looking at this state display, the user is able to learn the display quality of each program. The score of CH1 is 21, the score of CH2 is 10, the score of CH3 is 13, and the score of CH4 is 18. In addition, CH2 is being requested.

FIG. 29 shows an example of the state display by radio terminal 15 upon change from the score state shown in FIG. 21 to the score state shown in FIG. 22. Referring to FIG. 29, the display quality of CH1 is "Full Viewing," and the display quality of CH3 is "Half Viewing." These are identical to the state display of FIG. 28. However, the scores of CH2 and CH4 have reversed over the span from FIG. 21 to FIG. 22, and the score of CH2 has now surpassed that of CH4. Thus, in FIG. 29, the change of the display quality of the programs of CH2 and CH4 is being announced. In other words, the display quality of CH2 is "Change to Full," and the display quality of CH4 is "Change to Half." "Change to Full" announces the change to display quality that corresponds to a basic-rate channel. "Change to Half" announces the change to display quality that corresponds to a ½-rate channel. By looking at this display, the user is able to learn how the display quality of each program will change.

Figure 30:
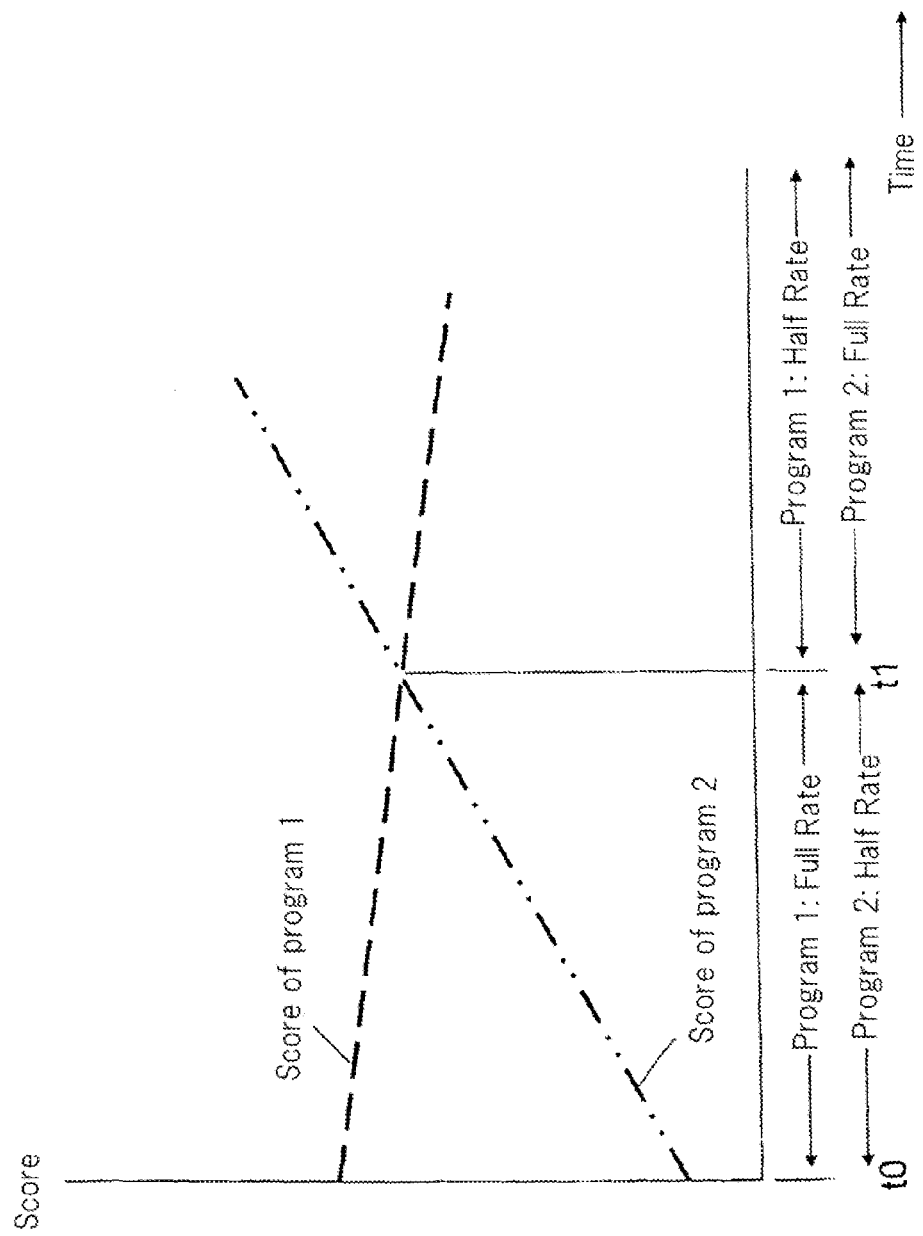
FIG. 30 shows the switching of programs that are broadcast on a radio channel.

FIG. 30 shows the change of display quality of programs that are broadcast on radio channels. In this figure, the vertical axis shows score and the horizontal axis shows time transition. The broken lines show the scores of each program. At time t0, program 1 has a higher score than program 2. However, at time t1, the scores of program 1 and program 2 are the same value, and the score of program 2 subsequently surpasses that of program 1. At first, a state holds in which program 1 is broadcast by a basic-rate channel (Full Rate) and program 2 is broadcast by a ½-rate channel (Half Rate), but after time t1, the state changes such that program 1 changes to a ½-rate channel and program 2 changes to a basic-rate channel.

When selecting programs that are to be broadcast by radio channels, protection may be applied to prevent frequent switching.

Figure 31:
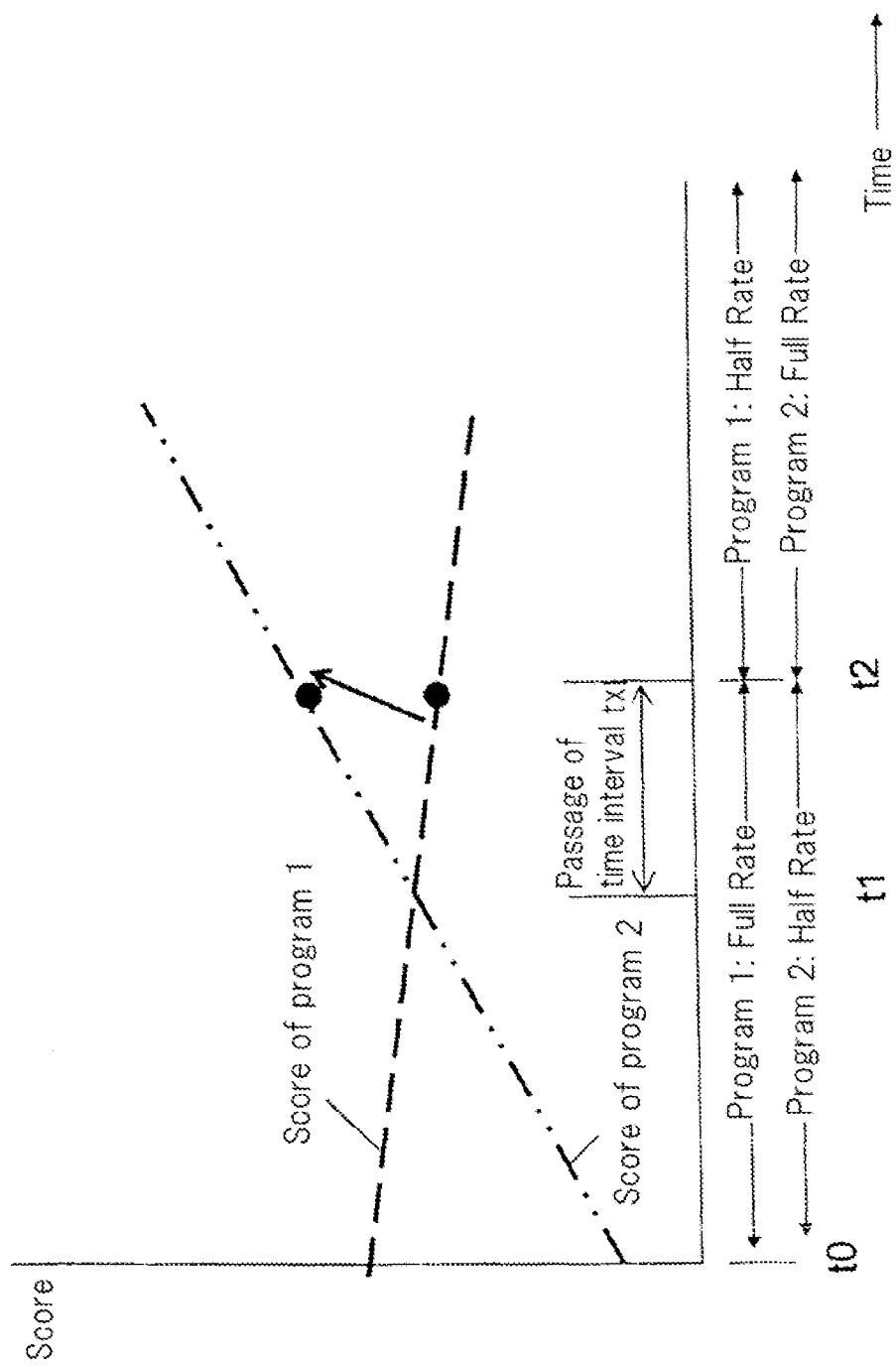
FIG. 31 is a view for explaining the switching of programs when applying protection relating to time.

FIG. 31 is a view for describing the state when the display quality of programs is changed in a case in which protection is applied regarding time. Referring to FIG. 31, the time transition of the scores of program 1 and program 2 is the same as in FIG. 30. In this example, however, the change of display quality of the programs is implemented not at the time (t1) of the reversal of the scores of program 1 and program 2, but rather, at a time (t2) at which the state in which the score of program 2 surpasses the score of program 1 has continued for a protection time (time tx). Not only is frequent change of the display quality prevented, but the user can also be forewarned of the change of display quality of the programs. Time tx can be freely set.

Figure 32:
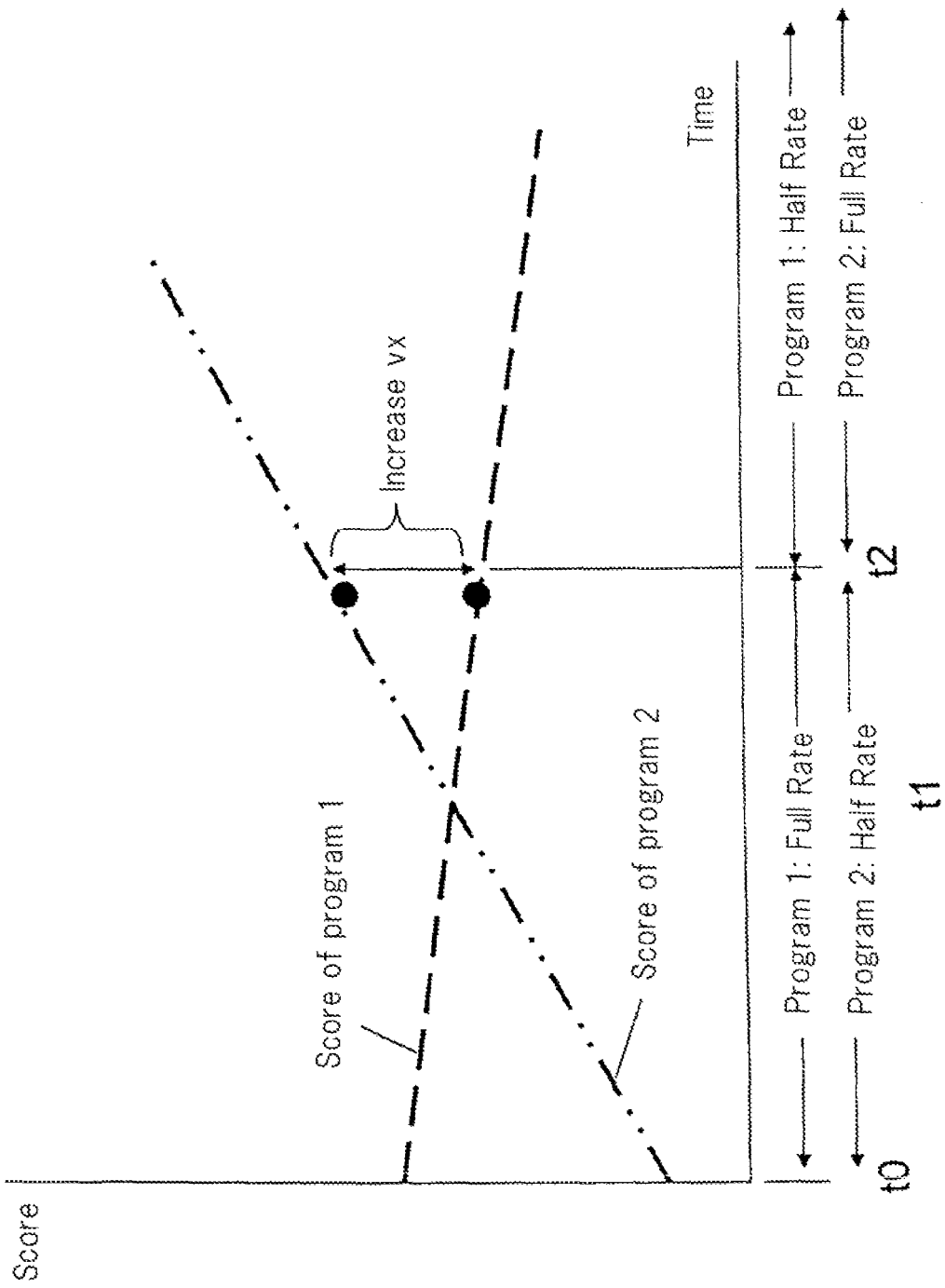
FIG. 32 is a view for explaining the switching of programs when applying protection relating to score.

FIG. 32 is a view for describing the state when the display quality of programs is changed when protection is applied with respect to scores. Referring to FIG. 32, the time transition of the scores of program 1 and program 2 is the same as in FIG. 30. In this example, however, the change of display quality of the programs is implemented not at the time (t1) of the reversal of the scores of program 1 and program 2, but rather, at the time (t2) at which the score of program 2 surpasses the score of program 1 by a protection value (increase vx). The increase vx can be freely set.

Figure 33:
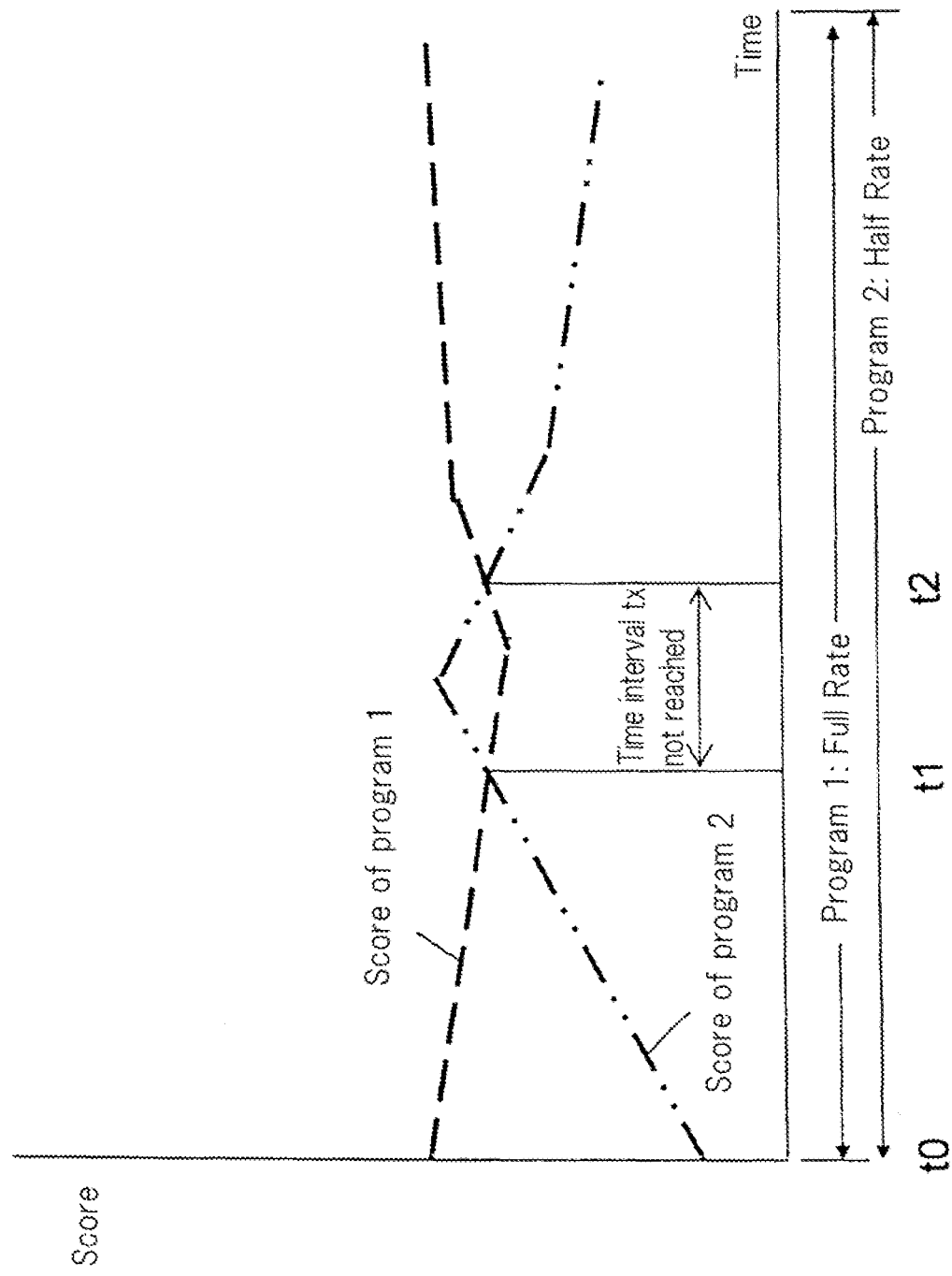
FIG. 33 is a view for explaining the state when program switching does not occur due to the application of protection relating to time.

FIG. 33 is a view for describing the state when a change in the display quality of programs does not occur due to the application of protection with respect to time. It is assumed that protection with respect to time is applied to changes of the display quality of the programs as described in FIG. 31. Referring to FIG. 33, the scores of program 1 and program 2 reverse at time t1. However, the scores of program 1 and program 2 again reverse at time t2 preceding the passage of time tx from time t1. As a result, a change of the display quality of the programs that are broadcast on radio channels is not implemented.

Examples of a broadcast system that uses radio lines has been shown in the exemplary embodiment and working examples hereinabove, but the present invention is not limited to this form. The present invention can be applied to a broadcast system that uses wired lines. In other words, the present invention can be applied to a broadcast system in which radio access network 16 is a cable access network and broadcast data are transmitted to terminals using wired lines. In addition, the communication channels that are used for transferring the data of broadcast content and report information that includes the scores of each program need not be the same as the communication channels that are used in transferring to terminals separate individual information that includes requests from terminals and responses to these requests, and wired communication channels and radio communication channels can be used freely. More specifically, communication channels can be used as appropriate in the patterns shown below:

(1) Radio channels are used both for the transfer of broadcast content and report information and for the transfer of individual information.
(2) Radio channels are used for the transfer of broadcast content and report information and wired channels are used for the transfer of individual information.
(3) Wired channels are used for the transfer of broadcast content and report information, and wired channels are used for the transmit of individual information.
(4) Wired channels are used for the transfer of broadcast content and report information, and radio channels are used for the transfer of individual information.

The data of the program content and report information that are distributed from broadcast apparatus 13 both have a high degree of simultaneity and uniformity of content and are therefore preferably broadcast on the same type of channel. On the other hand, requests from terminals and responses to these requests are highly individualistic and therefore need not be transferred on the same type of channel.

The above-described (2) assumes a form in which digital terrestrial broadcast is received in terminals (TVs) installed in residences, and the requests of viewers are collected and added to be reflected in the selection of broadcast programs. For example, in FIG. 1, the distributed data of program content and report information should be transmitted from broadcast apparatus 13 on radio channels, and request information sent to broadcast control apparatus 14 should be transmitted by wired channels of a cable network (not shown).

Figure 34:
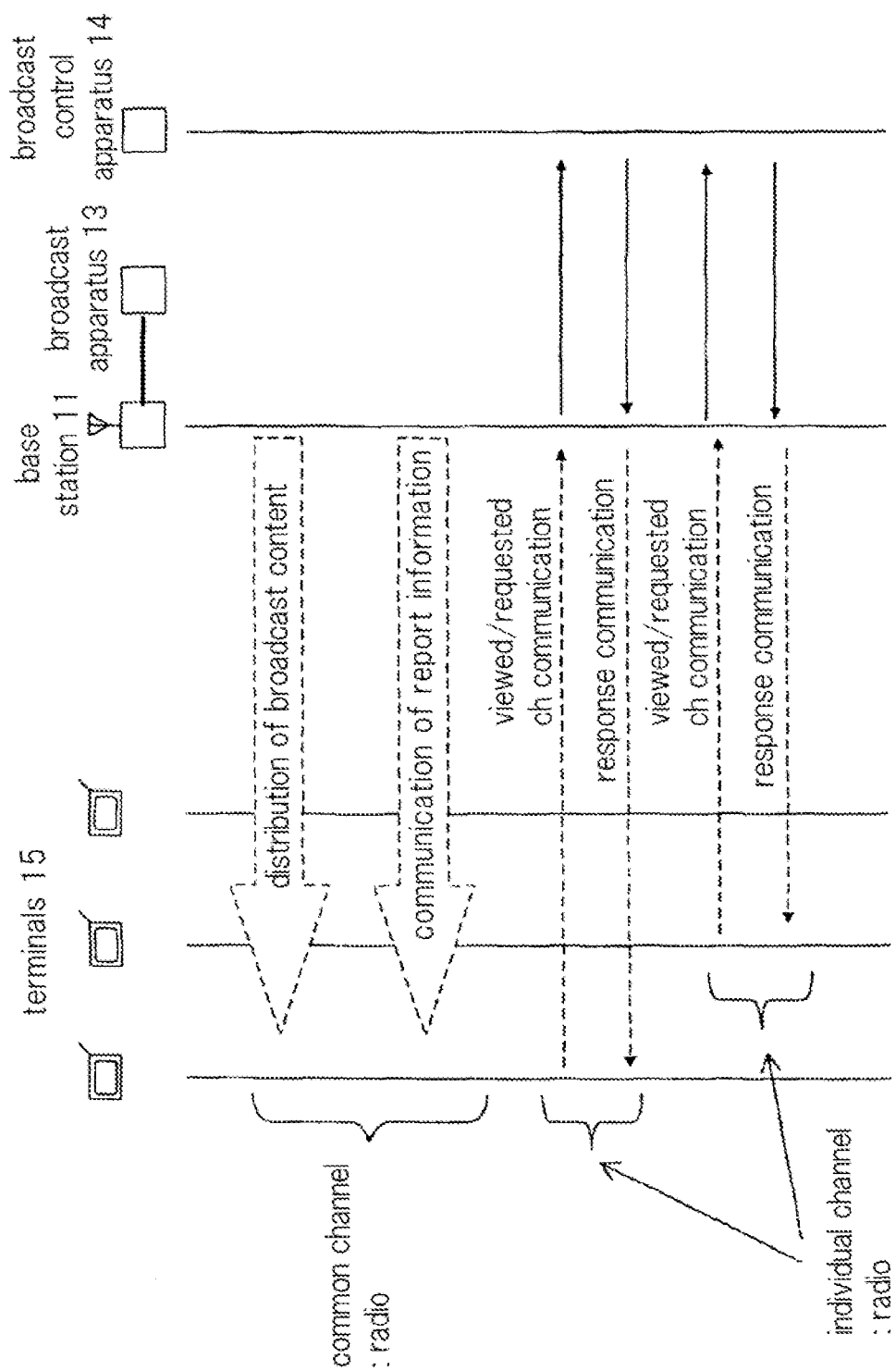
FIG. 34 shows an example of the state of signal transfer when a radio channel is used both for transferring broadcast content and report information and for transferring individual information.

FIG. 34 shows an example of signal transfer when radio channels are used both for the transfer of broadcast content and report information and for the transfer of individual information. This form corresponds to (1) described above. In this figure, the arrows in solid lines represent signal transfer by wired channels and the arrows in dotted lines represent signal transfer by radio channels. In this example, radio channels are used as broadcast/report information channels (common channels) for the transfer of report information and broadcast content having a high degree of simultaneity and uniformity of content. In addition, radio channels are also used as channels for individual information transfer (individual channels) for transferring viewing request messages having a high degree of individuality and responses to these messages.

Figure 35:
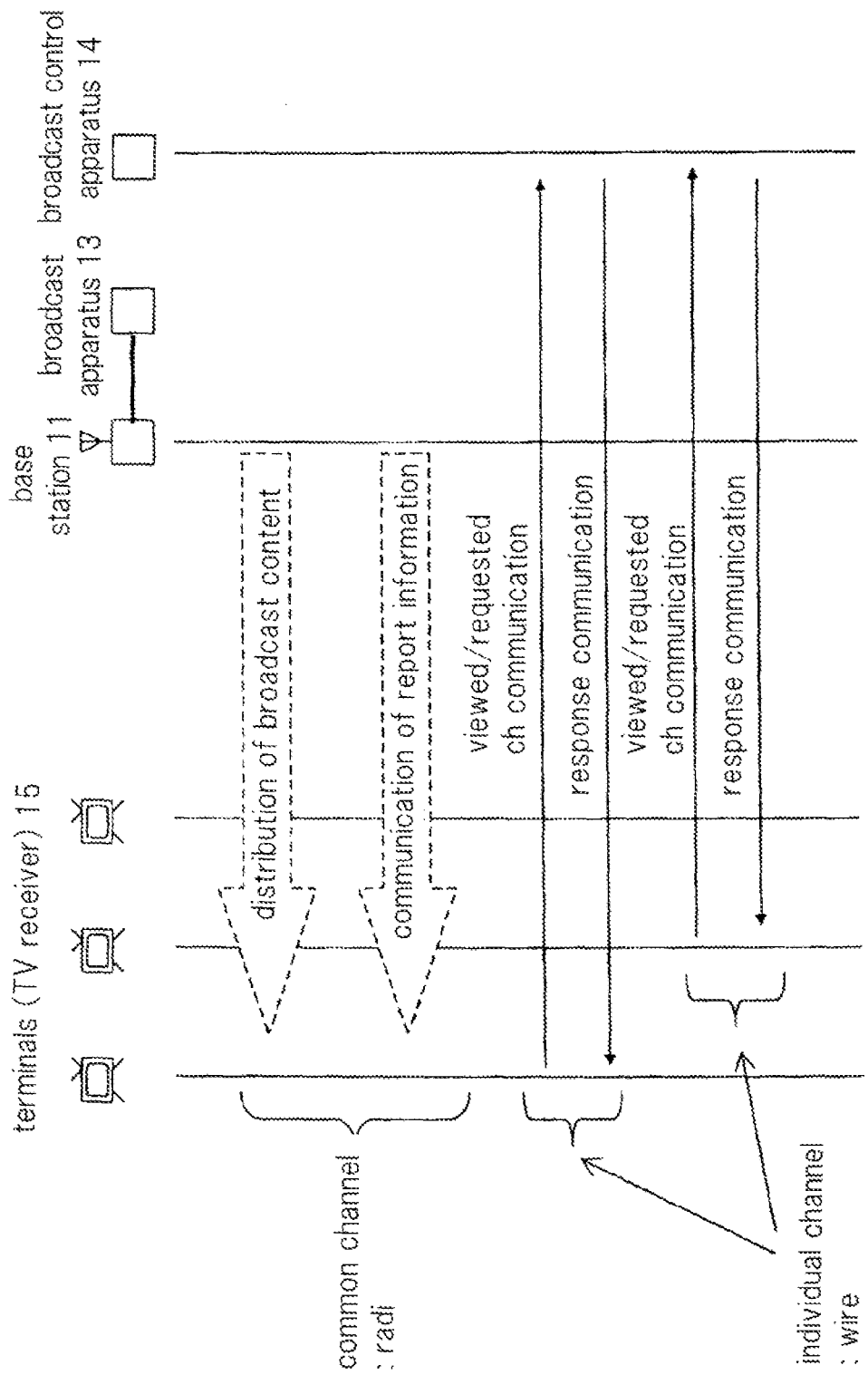
FIG. 35 shows an example of the state of signal transfer when a radio channel is used for transferring broadcast content and report information and a cable channel is used for transferring individual information.

FIG. 35 shows an example of the signal transfer when radio channels are used for the transfer of broadcast content and report information and wired channels are used for the transfer of individual information. This form corresponds to (2) described above. In this figure, arrows in solid lines represent signal transfer by wired channels, and arrows in dotted lines represent signal transfer by radio channels. In this example, radio channels are used as broadcast/report information channels to transfer report information and broadcast content having a high degree of simultaneity and uniformity of content. On the other hand, wired channels are used as individual information transfer channels for transferring viewing request messages having a high degree of individuality and responses to these messages.

The terminals of the present invention are not limited to mobile terminals and may be terminals (fixed terminals) that are permanently installed regardless of whether the terminals are wired or wireless. The entry-into areas shown in FIG. 10 is not assumed in the case of fixed terminals, but the same operations as the sequence shown in FIG. 10 are carried out upon the application of power to terminals, whether the terminals are mobile terminals or fixed terminals.

Although an exemplary embodiment of the present invention has been described hereinabove, the present invention is not limited to this exemplary embodiment, and this exemplary embodiment may be used in combination or portions of its construction may be altered within the scope of the technical idea of the present invention.

Although the present invention has been described hereinabove with reference to an exemplary embodiment and working examples, the present invention is not limited to the exemplary embodiment and working examples. The constitution and details of the present invention as defined in the claims are open to various modifications within the scope of the present invention that will be understood by one of ordinary skill in the art.

What is claimed is:

1. A broadcast system that assigns communication channels to programs to broadcast data of said programs to terminals, comprising:
   a broadcast apparatus that transmits data of said programs;
   a broadcast control apparatus that, for said programs that are transmitted from said broadcast apparatus, measures the extent of viewing requests from users of said terminals as scores and determines the service quality used in the broadcast of said programs based on said measured scores; and
   a communication access network apparatus that, upon determination of the service quality of said programs by said broadcast control apparatus, broadcasts data of said programs that are received from said broadcast apparatus by communication channels of a transmission rate that corresponds to the service quality;
   wherein:
   request information that includes viewing requests for programs by users is communicated from said terminals to said broadcast control apparatus;
   said broadcast control apparatus, based on the result of collecting and adding viewing requests of said request information that was communicated from said terminals, counts said scores for each of said plurality of programs;
   said request information includes as said viewing requests one or both of information of programs that are actually being viewed in said terminals and information of programs that are not actually being viewed in said terminals but for which viewing is requested;
   said broadcast control apparatus includes in the measurement of said scores both information of programs that are actually being viewed in said terminals and information of programs that are not actually being viewed in said terminals but for which viewing is requested;

one or more of said programs are selected for broadcast based on said scores for said programs, and said one or more of said programs the being broadcast, where no other of said programs are broadcast;

said terminals are movable between communication areas, said scores of programs are measured independently of each of the communication areas, and for each of the communication areas the programs to broadcast and the service used in the broadcast of the programs is determined based on the measured scores in the communication area; and said scores of programs are measured when the users operate the terminals, and the scores of programs are measured for each of the movement origin area and the movement destination area when each terminals is moved between areas, wherein the programs are broadcast by base station apparatuses of a mobile communication system, and wherein said broadcast control apparatus determines service quality used in the broadcast of each of said programs such that said service quality increases as said scores become higher and such that said service quality decreases as said scores become lower, including cases where said decreased service quality causes broadcasting of the program to be halted;

said score of each program is calculated by (score)=(viewing number)+(requesting number)−(number requesting other channels), wherein the viewing number is the number of said terminals that are actually viewing said program, the requesting number is the number of said terminals that are requesting said program, and the number requesting other channels is the number of said terminals that are currently viewing that program and further requesting another program.

2. The broadcast system as set forth in claim 1, wherein said broadcast control apparatus determines service quality used in the broadcast of said programs such that the total transmission rate of programs that are broadcast is accommodated within the band that can be used for the broadcast of programs.

3. The broadcast system as set forth in claim 1, wherein said broadcast control apparatus both selects programs that are to be broadcast from among programs that can be broadcast and determines service quality that is used in the broadcast of said programs that have been selected.

4. The broadcast system as set forth in claim 1, wherein said service quality is prescribed by either the resolution of images or the number of frames per unit time, or by both the resolution of images and the number of frames per unit time.

5. The broadcast system as set forth in claim 1, wherein said broadcast apparatus transmits data of the programs to said communication access network at a service quality that is determined based on said scores realized by said broadcast control apparatus.

6. The broadcast system as set forth in claim 1, wherein said communication access network apparatus causes data of said programs that were transmitted from said broadcast apparatus to conform to the service quality that was determined based on said scores by said broadcast control apparatus and broadcasts by said communication channels.

7. The broadcast system as set forth in claim 1, wherein said broadcast control apparatus, when the score of a particular program surpasses a value obtained by adding a predetermined protection value to the score of another program that is being broadcast at a higher service quality than the service quality of said program, determines to change the service quality of said program and said other program.

8. The broadcast system as set forth in claim 1, wherein said broadcast control apparatus, when a state in which the result of comparison between the score of a program that is being broadcast at a particular service quality and the score of another program that is being broadcast at a service quality that differs from said service quality satisfies predetermined conditions continues for at least a predetermined protection time interval, changes the service quality of said program and said other program.

9. A broadcast control apparatus that, in a broadcast system wherein communication channels are assigned to programs to broadcasts data of said programs to terminals, manages programs that are broadcast, comprising:

score measurement unit that, for each of programs that can be broadcast by said communication channels, measures the extent of viewing requests from users of said terminals as scores; and determination unit that, based on said scores that were measured in said score measurement unit, determines the service quality used in the broadcast of said programs;

wherein:

request information that includes viewing requests for programs by users is communicated from said terminals to said broadcast control apparatus;

said score measurement unit, based on the result of collecting and adding viewing requests of said request information that was communicated from said terminals, counts said scores for each of said plurality of programs;

said request information includes as said viewing requests one or both of information of programs that are actually being viewed in said terminals and information of programs that are not actually being viewed in said terminals but for which viewing is requested;

said score measurement unit includes in the measurement of said scores both information of programs that are actually being viewed in said terminals and information of programs that are not actually being viewed in said terminals but for which viewing is requested;

one or more of said programs are selected for broadcast based on said scores for said programs, and said one or more of said programs the being broadcast, where no other of said programs are broadcast; and said terminals are movable between communication areas, said scores of programs are measured independently of each of the communication areas, and for each of the communication areas the programs to broadcast and the service used in the broadcast of the programs is determined based on the measured scores in the communication area wherein the programs are broadcast by base station apparatuses of a mobile communication system, and wherein said broadcast control apparatus determines service quality used in the broadcast of each of said programs such that said service quality increases as said scores become higher and such that said service quality decreases as said scores become lower, including cases where said decreased service quality causes broadcasting of the program to be halted;

said score of each program is calculated by (score)=(viewing number)+(requesting number)−(number requesting other channels), wherein the viewing number is the number of said terminals that are actually viewing said program, the requesting number is the number of said terminals that are requesting said program, and the number requesting other channels is the number of said terminals that are currently viewing that program and further requesting another program.

10. A broadcast method for assigning communication channels to programs to broadcast data of said programs to terminals, comprising steps of:

for each of programs that can be broadcast by said communication channels, measuring the extent of viewing requests from users of said terminals as scores; and based on said scores that were measured in score measurement unit, determining service quality used in the broadcast of said programs;

wherein:

request information that includes viewing requests for programs by users is communicated from said terminals to said broadcast control apparatus, and said score measurement unit, based on the result of collecting and adding viewing requests of said request information that was communicated from said terminals, counts said scores for each of said plurality of programs;

said request information includes as said viewing requests one or both of information of programs that are actually being viewed in said terminals and information of programs that are not actually being viewed in said terminals but for which viewing is requested, and said score measurement unit includes in the measurement of said scores both information of programs that are actually being viewed in said terminals and information of programs that are not actually being viewed in said terminals but for which viewing is requested;

one or more of said programs are selected for broadcast based on said scores for said programs, and said one or more of said programs the being broadcast, where no other of said programs are broadcast; and said terminals are movable between communication areas, said scores of programs are measured independently of each of the communication areas, and for each of the communication areas the programs to broadcast and the service used in the broadcast of the programs is determined based on the measured scores in the communication area, wherein the programs are broadcast by base station apparatuses of a mobile communication system, and wherein said service quality used in the broadcast of each of said programs is determined such that said service quality increases as said scores become higher and such that said service quality decreases as said scores become lower, including cases where said decreased service quality causes broadcasting of the program to be halted;

said score of each program is calculated by (score)=(viewing number)+(requesting number)−(number requesting other channels), wherein the viewing number is the number of said terminals that are actually viewing said program, the requesting number is the number of said terminals that are requesting said program, and the number requesting other channels is the number of said terminals that are currently viewing that program and further requesting another program.

11. The broadcast method as set forth in claim 10, wherein service quality used in the broadcast of each of said programs is determined such that said service quality increases with higher said scores.

12. The broadcast system as set forth in claim 1, wherein said broadcast control apparatus communicates to said terminals and displays on said terminals scores of each of programs that were measured as report information.

13. The broadcast control apparatus as set forth in claim 9, further comprising notification unit that communicates to said terminals and displays on said terminals scores of each of the programs that were measured as report information.

14. The broadcast method as set forth in claim 10, wherein scores of each of the programs that were measured are communicated to said terminals and displayed on said terminals as report information.

15. The broadcast system as set forth in claim 1, wherein said terminals can move among areas in which said one or more of said programs are being broadcast without having reception thereof interrupted.

16. The broadcast control apparatus as set forth in claim 9, wherein said terminals can move among areas in which said one or more of said programs are being broadcast without having reception thereof interrupted.

17. The broadcast method as set forth in claim 10, wherein said terminals can move among areas in which said one or more of said programs are being broadcast without having reception thereof interrupted.

* * * * *